United States Patent [19]
Rubenstein et al.

[11] 3,905,871
[45] Sept. 16, 1975

[54] LACTAM CONJUGATES TO ENZYMES

[75] Inventors: Kenneth E. Rubenstein, Menlo Park; Edwin F. Ullman, Atherton, both of Calif.

[73] Assignee: Syva Company, Palo Alto, Calif.

[22] Filed: Oct. 10, 1974

[21] Appl. No.: 513,662

Related U.S. Application Data

[63] Continuation-in-part of Ser. No. 143,609, May 14, 1971, abandoned, and a continuation-in-part of Ser. No. 304,157, Nov. 6, 1972, Pat. No. 3,852,157.

[52] U.S. Cl........ 195/63; 195/103.5 R; 195/DIG. 11
[51] Int. Cl.$^2$.......................................... G01N 31/14
[58] Field of Search......... 195/63, DIG. 11, 103.5 R

[56] References Cited
UNITED STATES PATENTS
3,850,752   11/1974   Schuurs et al. ...................... 195/63

Primary Examiner—Alvin E. Tanenholtz

[57] ABSTRACT

Novel biological assay method for determining the presence of a specific organic material by employing a modified enzyme for amplification. By employing receptors specific for one or a group of materials (hereinafter referred to as "ligands") and binding an enzyme to the ligand or ligand counterfeit to provide an "enzyme-bound-ligand", an extremely sensitive method is provided for assaying for ligands. The receptor, when bound to the enzyme-bound-ligand, substantially inhibits enzymatic activity, providing for different catalytic efficiencies of enzyme-bound-ligand and enzyme-bound-ligand combined with receptor.

The receptor, ligand and enzyme-bound-ligand are combined in an arbitrary order and the effect of the presence of ligand on enzymatic activity determined. Various protocols may be used for assaying for enzymatic activity and relating the result to the amount of ligand present.

The enzyme conjugates employed in ths invention are lactams having from five to six annular members. The lactams include amide, imide, and urea functionalities, including compounds based on glutethimide, barbiturates, primidone and diphenyl hydantoin.

13 Claims, No Drawings

LACTAM CONJUGATES TO ENZYMES

CROSS REFERENCE TO RELATED APPLICATION

This application is a continuation-in-part of application Ser. No. 143,609, filed May 14, 1971, now abandoned, and is a continuation-in-part of application Ser. No. 304,157, filed Nov. 6, 1972, now U.S. Pat. No. 3,852,157.

BACKGROUND OF THE INVENTION

1. Field of the Invention

There is a continually pressing need for rapid, accurate qualitative and quantitative determinations of biologically active substances at extremely low concentrations. The purpose of the determination can be extremely varied. Today, there is a wide need for determining the presence of drugs or narcotics in body fluids, such as saliva, blood or urine. In addition, in medical diagnosis, it is frequently important to know the presence of various substances which are synthesized naturally by the body or ingested. These include hormones, both steroidal and polypeptides, prostaglandins, toxins, as well as other materials which may be involved in body functions. Frequently, one is concerned with extremely small amounts and occassionally, with very small differences in concentrations.

To meet these needs, a number of ways have been devised for analyzing for trace amounts of materials. A common method is to use thin layer chromatography (TLC). By determining the flow factors and using specific reagents, the presence of certain materials can be detected; in many instances, the particular material can be isolated and identified quantitatively, for example, by mass spectroscopy or gas phase chromatography. However, thin layer chromatography has a number of deficiencies in being slow, requiring a high degree of proficiency in its being carried out, being subject to a wide range of interfering materials, and suffering from severe fluctuations in reliability. Therefore, the absence of satisfactory alternatives has resulted in intensive research efforts to determine improved methods of separation and identification.

An alternative to thin layer chromatography has been radioimmunoassay. Here, antibodies are employed for specific haptens or antigens. A radioactive analog employing a radioactive atom of high flux is used and bound to the antigen. By mixing an antibody with solutions of the hapten or antigen and the radioactive hapten or antigen analog, the radioactive analog will be prevented from binding to the antibody in an amount directly related to the concentration of the hapten or antigen in the solution. By then separating the free radioactive analog from the antibody bound radioactive analog and determining the radioactivity of the separate components, one can determine the amount of hapten or antigen in the original solution.

The use of radioactive materials is not desirable for a variety of reasons. First, radioactivity creates handling problems and undesirable hazards. Secondly, the preparation of such compounds involves similar hazards, greatly enhanced by the much larger amounts of radioactive materials which are present. Because of their instability, the radioactive materials have only a short life. In addition, the use of radioactive materials requires a license from the Atomic Energy Commission, subjecting the licensee to review by the Commission as to the maintenance of minimum operating standards. These standards may change from time to time, so as to involve added expense and inconvenience to the licensee. Finally, the separation of the bound and unbound radioactive analog is difficult and subject to error. See, for example, Abraham, Prelim. Comm., 29, 866 (1969).

Besides the aforementioned materials, assays at extremely low concentrations would be desirable for a variety of pesticides, such as insecticides, bactericides, fungicides, etc., as well as other organic pollutants, both in the air and water. Organic pollutants may be assayed whenever a receptor can be devised and the pollutant is inert to the reagents employed.

2. Description of the Prior Art

Use of radioimmunoassay is described in two articles by Murphy, J. Clin. Endocr. 27, 973 (1967); ibid., 28, 343 (1968). The use of peroxidase as a marker in an immunochemical determination of antigens and antibodies is found in Stanislawski et al, C. R. Acad. Sci. D. 1970, 271 (16), 1442-5. (C. A. 74 1144 B). See also, Nakane, et al., J. of Histochem. and Cytochem. 14, 929 (1967) and Avrameas, Int. Rev. of Cytology, 27, 349 (1970). A general description of thin layer chromatography for assay may be found in Stahl, Thin Layer Chromatography, Springer Verlag, New York, 1969. See also, Peron, et al., Immunologic Methods in Steroid Determination, Appleton, Century Crofts, New York, 1970.

Also of interest are publications by Van Weemen, et al, FEBS Letters 14, 232 (1971), and Engvall, et al., Immunochemistry, 8, 871 (1971) concerned with immunoassays employing enzymes. See also U.S. Pat. Nos. 3,654,090 and 3,817,837. See also, Cinader, Proceedings of the Second Meeting of the Foundation of European Biochemical Societies, Pergamon, Oxford, 1967, vol. II, chapter four.

The following Offenlegungsschrifts Nos. 2,155,658, 2,164,768, 2,202,441, 2,206,103, 2,323,467, and 2,324,554 are also concerned with enzyme conjugates.

SUMMARY OF THE INVENTION

Detection of ligands is obtained at extremely low concentrations by using specific receptor sites for the ligand and enzyme amplification of ligand displacement. By bonding a ligand or a ligand counterfeit to an enzyme while retaining enzymatic activity and then combining the enzyme-bound-ligand to a receptor for the ligand, the presence and amount of ligand in an unknown solution may be readily determined. By competition for receptor sites between the enzyme-bound-ligand and the free ligand, the two ligand moieties being added to the receptor simultaneously or sequentially, the difference in enzymatic activity resulting from the presence or absence of ligand may be determined in accordance with a particular analytical scheme. This difference will be related to the amount of ligand present in the unknown solution. Enzymatic activity is easily determined in known ways by following the change in concentration of an enzyme substrate or product of the substrate by standard techniques.

By bonding lactam derivatives related to known drugs to enzymes, enzyme conjugate products are obtained which are useful for the detection of specific drugs. The binding of antibody to the drug conjugated to the enzyme results in a substantial change in activity of the enzyme. Enzymes of particular interest are the oxidoreductases and the hydrolases.

DESCRIPTION OF THE SPECIFIC EMBODIMENTS

This invention provides a method for detecting or assaying extremely low concentrations of a wide range of organic materials by relating the presence of a particular unknown to enzymatic activity. An amplification is obtained by having a large number of molecules formed or transformed as a result of the presence of one molecule. This amplification is achieved by bonding the compound to be assayed or a counterfeit of the compound to an enzyme. This assemblage is referred to as an enzyme-bound-ligand. The particular molecule to be assayed is referred to as a ligand. The ligand analog will include either a ligand which is modified by replacing a proton with a linking group to bond to the enzyme or a ligand counterfeit which is a ligand modified by other than simple replacement of a proton to provide a linking site to the enzyme. The ligand and the enzyme-bound-ligand are both capable of binding in a competitive fashion to specific receptor sites. It should also be noted that other compounds of very similar structure may serve as ligands capable of competing for these sites, e.g. morphine glucuronide and codeine will compete with enzyme-bound-morphine for binding to certain types of morphine antibodies. In most instances, this is advantageous in permitting one to assay for a class of physiologically closely related compounds.

Various methods or protocols may be employed in assaying for a wide variety of ligands. Normally, the ligand, enzyme-bound-ligand and receptor will be soluble in the medium employed. The substrate(s) for the enzyme may or may not be soluble in the medium. In some situations it may be desirable to provide a synthetic substrate which is not soluble or employ an insoluble natural substrate.

In carrying out the assay, the enzyme-bound-ligand is combined with a high molecular weight receptor which results in inhibition of enzymatic activity. When a ligand and enzyme-bound-ligand are introduced into a solution containing ligand receptor, the enzymatic activity of the solution after the three substances are combined will be affected by the concentration of the ligand present in the solution. That is, the enzyme-bound-ligand and the ligand will compete for the receptor sites. The number of enzyme-bound-ligand molecules not inhibited by the receptor will be directly related to the number of ligand molecules present in the solution. One can achieve this in two ways: (1) either by competition, whereby the enzyme-bound-ligand and ligand are introduced to the receptor substantially simultaneously; or (2) the enzyme-bound-ligand or ligand may be first added to the receptor, and the system allowed to come to equilibrium, and then the ligand added or enzyme-bound-ligand added respectively, in effect, to displace the material originally added from the receptor. Since the enzymatic activity will be diminished or inhibited when the enzyme-bound-ligand is bound to the receptor, the enzymatic activity of the solution will be directly related to the amount of ligand present in the solution.

The assay can be carried out, either by considering the effect of ligand on the rate at which enzyme-bound-ligand binds to receptor or the effect of ligand on the equilibrium between the reagents: enzyme-bound-ligand and receptor. Where enzyme-bound-ligand and ligand are present with receptor, one need not wait until equilibrium is achieved between the three species. If one measures the enzymatic activity at a specific time or interval of time from the time of combination of the three species, the enzymatic activity of the assay mixture will be a function of the effect of the ligand on the rate of binding of the enzyme-bound-ligand to the receptor. By determining standards under the same conditions, including the same time interval, employing different concentrations of ligand, a smooth standard curve is obtained.

By measuring the effect of the ligand on rate of binding, rather than the effect on equilibrium, a shorter time interval between the time of combining the reagents and unknown suspected of containing the ligand and the time for the determination will be involved, as compared with waiting until equilibrium is achieved. It is frequently found that reproducible values can be obtained in from 0.1 to 5 minutes after combining the reagents and unknown. The rate of enzymatic activity is usually determined over a short time interval, e.g., 1 minute. The time interval can be the second, third, etc. minute from the time when the reagents and unknown were combined.

The concentrations of the reagents: the enzyme-bound-ligand and the receptor, may be varied widely. Normally, the concentration of receptor (based on active sites) and enzyme-bound-ligand will be from about $10^{-4}$ to $10^{-14}$ M, more usually from $10^{-6}$ to $10^{-12}$ M. The lower limit for the concentration of enzyme-bound-ligand is predicated on the minimum amount which can be detected. This will vary with different enzymes as well as different detection systems.

The amount of receptor employed is normally calculated based on receptor sites and will vary with the concentration of enzyme-bound-ligand, the ratio of ligand to enzyme in the enzyme-bound-ligand, and the affinity of the receptor for the ligand. Usually, there will be at least 1 active receptor site per molecule of enzyme-bound-ligand and less than about 20 active sites per molecule of ligand as enzyme-bound-ligand, but siteligand molecule ratios may be as high as 1,000 to 1, depending on the type of assay and the affinity of the receptor. Preferably, the ratio of receptor active sites to molecules of enzyme-bound-ligand will be at least one, usually at least two, and the ratio of active sites to molecules of ligand as enzyme-bound-ligand will be less than about 5 to 1. The ratio will vary to a great degree depending on binding constants and the amount of ligand suspected of being present. The method of determining binding sites for the receptor will be discussed subsequently in the experimental section.

The enzyme-bound-ligand will usually have molecules of ligand to enzyme subunit ratios on the average over the entire composition in the range of 0.01–100:1, frequently 0.02–50:1, and more frequently about 0.04–25:1, wherein the number of ligands when the ligand is a protein is expressed as the number of ligand molecules times the number of its component polypeptide chains. For small ligands (less than about 10,000 molecular weight), there will generally be at least one ligand, more usually at least two ligands per enzyme, while with large ligands (greater than about 5,000 molecular weight) there will generally be at least one enzyme per ligand. In the area of overlap, the ratio will depend on the nature of the ligand, among other factors to be discussed.

The number of small ligands per enzyme will be affected to some degree by the molecular weight of the enzyme. However, normally, the fewer molecules of ligand bound to an enzyme to achieve the desired degree of inhibitability with receptor, the more sensitive the assay. Therefore, the number of small ligands per enzyme will usually not exceed 40, more usually not exceed 30, and will not exceed 1 ligand per 2,000 molecular weight of enzyme on the average over the entire composition. Usually, the range of ligands will be 1 to 40, more usually 1 to 24, and with random substitution 2 to 20.

With the oxidoreductases, the number of lactam ligands will generally vary from about 2 to 30, usually 4 to 24, and more usually 6 to 20. However, as few as one ligand may be satisfactory in many instances. The number of ligands is related to the number necessary to provide the desired change in enzyme activity, while still providing an acceptable turnover rate.

In some instances, a number of enzymes bind together in a stable arrangement to form a multienzyme complex. Because of the juxtaposition of the enzymes, a number of reactions may be carried out sequentially in an efficient manner, providing localized high concentrations of reactants. Therefore, the ligand may be bound to a combination of enzymes, whereby there will be a plurality of enzymes per ligand. If a number of ligands were bound to the multienzyme complex, one could have 1:1 mole ratio of enzymes to ligand, although, in fact, there would be a plurality of enzymes and ligands involved in a single aggregation. The number of enzymes bound together, either as a multienzyme complex or by another mechanism will rarely exceed 20, usually not exceed 10, and commonly be in the range of 2 to 5 enzymes.

The concentration of receptor and enzyme will be related to the range of concentration of the ligand to be assayed. The solution to be assayed will be used directly, unless a relatively high concentration of ligand is present. If a high concentration is present, the unknown solution will be diluted so as to provide a convenient concentration. However, in many biological systems of interest, the amount of material being assayed will be relatively small and dilution of the unknown substrate will usually not be required.

To illustrate the subject method, a soluble receptor is employed for a particular ligand. For illustrative purposes, the ligand will be considered the hapten, diphenyl hydantoin, and the receptor will be an antibody specific for diphenyl hydantoin. It should be noted parenthetically, that antibodies generally recognize molecular shape and distribution of polar groups in a ligand, although a portion of the ligand may be significantly modified without preventing recognition. For example, both diphenyl hydantoin and its para-hydroxy derivative can be bound to certain diphenyl hydantoin antibodies.

An enzyme is first modified by bonding one or more diphenyl hydantoin molecules to the enzyme; a sufficient number of diphenyl hydantoin groups are employed so that greater than about 20% inhibition, usually 50% inhibition, and preferably, at least 70% inhibition is obtained when the maximum number of ligands are conjugated to receptor. By inhibition is intended a percentage reduction of the activity of the enzyme conjugate in the presence of excess receptor for the ligand. Complete inhibition in the assay medium is usually neither necessary nor desirable. In many instances, all that is required is that there be a measurable difference between completely uninhibited and maximally inhibited enzyme-bound-ligand, which would allow for a semi-quantitative or quantitative determination of a ligand through a desired range of concentrations. Any convenient enzyme can be used that will catalyze the reaction of a substrate that can be easily detected and for which a substrate is available, which allows for inhibition of the enzyme when bound to receptor.

A solution is prepared of the antibody at the requisite concentration. Only a few microliters of solution are required. The antibody, maintained at a pH at which it is active in binding diphenyl hydantoin, is introduced into a solution of the enzyme-bound-diphenyl hydantoin at the desired concentration. The reactivity of the combined antibody and enzyme-bound-diphenyl hydantoin solution can be determined by taking an aliquot, adding it to its substrate under conditions where the enzyme is active, and determining the spectroscopic change as a function of time at a constant temperature. The rate of this change will be the result that should be obtained when there is no diphenyl hydantoin present in the unknown solution.

Normally, the ligand and enzyme-bound-ligand reversibly bind to receptor, so that the order of addition of reagents is not crucial.

A second aliquot is taken and added to the unknown solution. The unknown solution may contain the substrate and any other additives which are required for enzymatic activity. Alternatively, the unknown solution may first be combined with the antibody-(enzyme-bound-diphenyl hydantoin) complex, allowed to come to equilibrium and then mixed with the substrate. In either case, the rate of change in the spectrum is determined. A variant of the above method is to add combined enzyme-bound-diphenyl hydantoin and unknown solution to the antibody and then add this solution to the substrate. Other obvious variations come readily to mind.

If all concentrations of reagents except diphenyl hydantoin are kept constant and several standard solutions of diphenyl hydantoin are employed, then one can relate the change in the spectrum over a specified period of time to the diphenyl hydantoin concentration. Obviously, the standardized system can then be used to determine rapidly, accurately, and efficiently the amount of diphenyl hydantoin to the unknown.

The manner of assaying for the enzyme can be widely varied depending on the enzyme, and to some degree the ligand and the medium in which the ligand is obtained. Conveniently, spectrophotometric measurements can be employed, where a cofactor, a substrate or the product of the substrate absorbs light in the ultraviolet or visible region. However, in many instances, other methods of determination may be preferred. Such methods include fluorimetry, measuring luminescence, ion specific electrodes, viscometry, electron spin resonance spectrometry, and meetering pH, to name a few of the more popular methods.

The assays will normally be carried out at moderate temperatures, usually in the range of from 10° to 50°C, and more usually in the range of about 15° to 40°C. The pH of the assay solutions will be in the range of about 5 to 10, usually about 6 to 9. Illustrative buffers include (trishydroxymethyl)-methylamine salt, carbonate, borate, barbiturate, and phosphate.

Whether oxygen is present or the assay is carried out in an inert atmosphere, will depend on the particular assay. Where oxygen may be an interferant, an inert atmosphere will normally be employed. Normally, hydroxylic media will be employed, particularly aqueous media, since these are the media in which the enzyme is active. However, 0 to 40 volume percent of other liquids may also be present as co-solvents, such as alcohols, esters, ketones, amides, etc. The particular choice of the co-solvent will depend on the other reagents present in the medium, the effect on enzyme activity, and any desirable or undesirable interactions with the substrate or products.

As already indicated, antibodies will frequently recognize a family of compounds, where the geometry and spatial distribution of polar groups are similar. Frequently, by devising the haptenic structure and the method of binding to the antigen when producing the antibodies, the specificity of the antibody can be varied. In some instances, it may be desirable to use two or more antibodies, usually not more than six antibodies, so that the antibody reagent solution will be albe to detect an entire group of compounds, e.g. barbiturates. This can be particularly valuable for screening a sample to determine the presence of any member of a group of compounds or determining whether a particular class of compounds is present, e.g. drugs of abuse. When combinations of antibodies are used, it will usually be necessary to employ corresponding combinations of enzyme-bound-ligands.

LIGAND

The ligands of interest in this invention are those cyclic ligands of from 5 to 6 annular members having a lactam group. The lactam may have one or two amido links in the ring, imide links, or urea links. Many of these compounds find use as anti-convulsants, particularly in the treatment of epileptics.

The drugs are effective in operating on the central nervous system.

The lactam family of drugs includes such drugs as barbiturates, diphenyl, hydantoin, primidone, and glutethimide, as well as their metabolites. The conjugates of these compounds to enzymes will for the most part have the following formula:

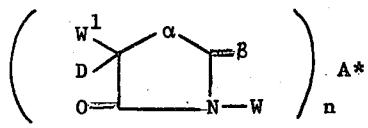

wherein:
one of the W groups is $X^*$ or a hydrogen of one of the W groups is replaced by $X^*$;
D is hydrogen or hydrocarbyl of from 1 to 8 carbon atoms, usually having from 0 to 1 site of ethylenic unsaturation, wherein hydrocarbyl includes alkyl, alkenyl, cycloalkyl, cycloalkenyl, or aryl hydrocarbon, preferably D is of from 1 to 6 carbon atoms and will usually be phenyl, alkyl of from 2 to 6 carbon atoms, alkenyl of from 3 to 4 carbon atoms, e.g. allyl, cyclohexyl or cyclohexenyl, the alkyl group being either straight chain or branched, usually branched when over 2 carbon atoms;
$\beta$ is $H_2$ or chalcogen (O, S) when $\alpha$ is amido and is otherwise oxygen;

$\alpha$ is of the formula:
—$CH_2$—$CH_2$—(ethylene);
—CO—NH—(amido):
—NH—(imino);
when other than $X^*$, W is hydrogen and $W^1$ is hydrocarbyl of from 1 to 8 carbon atoms, usually 2 to 8 carbon atoms, more usually from 2 to 6 carbon atoms having from 0 to 1 site of ethylenic unsaturation, including alkyl, alkenyl, cycloalkyl, cycloalkenyl or aryl hydrocarbon;
$A^*$ is an enzyme bonded at other than its reactive site, having a number (n) of ligands in the range of 1 to the molecular weight of $A^*$ divided by 2,000, usually in the range of 2 to 30, more usually from 4 to 24, and more frequently from 6 to 20; and
$X^*$ is a bond or linking group of from 1 to 10 atoms other than hydrogen, usually of from 2 to 8 atoms other than hydrogen, which are usually carbon, oxygen, and nitrogen, wherein the carbon is present as aliphatic, alicyclic or aromatic hydrocarbon, usually aliphatic or aromatic hydrocarbon, generally having from 0 to 1 site of ethylenic unsaturation as the only aliphatic unsaturation, the oxygen being present as carbonyl, both non-oxo and oxo, or oxy particularly ethereal, and the nitrogen being present as amino, particularly tertiary amino, or amido, there generally being from 0 to 4 heteroatoms, there usually being from 0 to 2 heteroatoms in the chain; normally, there are from 1 to 4, more usually 1 to 2 heterofunctionalities either in or along the chain.

When alpha is imino, D is normally phenyl. When alpha is ethylene, D is phenyl or ethyl. When beta is hydrogen, alpha is amindo.

The preferred enzymes are the hydrolases and the oxidoreductases, particularly the hydrolases classified in group 3.2, more particularly 3.2.1 and the oxidoreductases classified in 1.1, more particularly 1.1.1. These enzymes are illustrated by lysozyme, malate dehydrogenase, and glucose 6-phosphate dehydrogenase.

Within the above formula, are a number of different subgenera, e.g. barbiturates, based on barbituric acid, disubstituted at the 5-position.

BARBITURATES

A wide class of synthetic drugs which finds extensive and frequent abuse are the barbiturates. These compounds are synthetically readily accessible and their use only difficultly policed. The compounds which find use will come within the following formula:

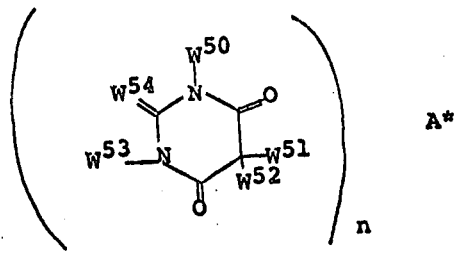

wherein:
any one of the W groups can be $-X^*$;
$X^*$, $A^*$, and n have been defined previously;
$W^{50}$ is hydrogen, alkyl of from 1 to 3 carbon atoms, e.g., methyl or alkali metal, e.g., sodium;

$W^{51}$ and $W^{52}$ are hydrogen, alkyl, alkenyl, cycloalkyl, cycloalkenyl, or aryl hydrocarbon of from 1 to 8, more usually 1 to 6 carbon atoms, e.g., ethyl, n-butyl, α-methylbutyl, isoamyl, allyl, $\Delta^1$-cyclohexenyl, and phenyl;

$W^{53}$ is hydrogen, or alkali metal, e.g., sodium;

$W^{54}$ is oxygen or sulfur.

Illustrative compounds are veronal, medinal, luminal, prominal, soneryl, nembutal, amytal, dial, phenadorn, seconal, evipan, phenobarbital and pentothal.

Preferred compounds would have $W^{50}$ or $W^{51}$ or a hydrogen of $W^{50}$ or $W^{51}$ as $-X^*$. Also preferred is when one of $W^{51}$ and $W^{52}$ is hydrocarbyl of from 2 to 8 carbon atoms.

Illustrative compounds which may be linked to an enzyme include 5,5-diethyl-1-carboxymethylbarbituric acid, 5-ethyl-5-n-butyl-1-succinoylbarbituric acid, 5-ethyl-5-phenyl-1-(N'-(2'''-chloroethyl)-2''-aminoethyl)barbituric acid, 5-(2'-carboxy-$^{1''}$ $^{2'}$-cyclohexenyl)-1,5-dimethylbarbituric acid, N-carboxymethyl phenobarbital, 5-(γ-crotonic acid)-5-(2'-pentyl)barbituric acid, 5-(p-aminophenyl)-5-ethylbarbituric acid, 5-(5'-pentanoic acid)-5-(2'-pentyl)barbituric acid, and 1-methyl-5-ethyl-5-(p-carboxyphenyl)barbituric acid.

Of particular interest are those barbiturates bonded to an enzyme of the formula:

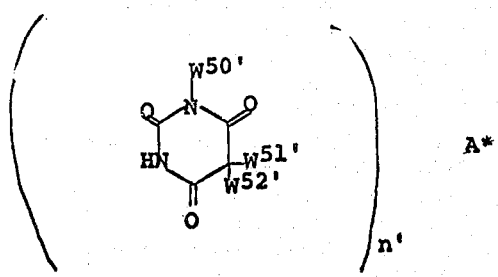

wherein one of $W^{50'}$ and $W^{51'}$ is $-X^{}$; when other than $-X^{}$:

$W^{50'}$ is hydrogen, methyl or alkali metal, e.g., sodio; and $W^{51'}$ is hydrocarbon of from 1 to 8 carbon atoms, having from 0 to 1 site of ethylenic unsaturation;

$W^{52'}$ is hydrocarbon of from 2 to 8 carbon atoms, having from 0 to 1 site of ethylenic unsaturation;

$X^{**}$ is $-Z-CO-$, wherein Z is hydrocarbylene of from 1 to 7 carbon atoms, usually aliphatic, having from 0 to 1 site of ethylenic unsaturation;

$A^*$ and $n'$ have been defined previously.

GLUTETHIMIDE

Another compound of interest is glutethimide, wherein the enzyme bound analog will have the following formula:

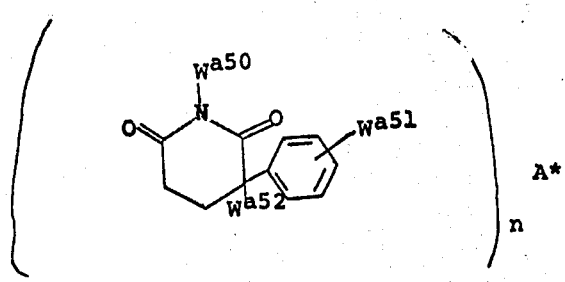

wherein:
any one of the W groups can be $-X^*$;
$X^*$, $A^*$ and $n$ have been defined previously;
$W^{a50}$ and $W^{a51}$ are hydrogen; and
$W^{a52}$ is lower alkyl of from 1 to 3 carbon atoms, e.g., ethyl.

DIPHENYL HYDANTOIN

Another compound of interest is the antiepileptic drug diphenyl hydantoin. This compound and its analogs will have the following formula:

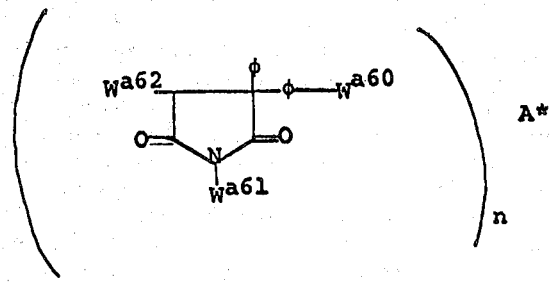

wherein:
any one of the W groups can be $-X^*$;
$X^*$, $A^*$ and $n$ have been defined previously;
$\phi$ is phenyl;
$W^{a60}$, $W^{a61}$ and $W^{a62}$ are hydrogen.

PRIMIDONE

Another compound of interest is Primidone which is related to the barbital drugs lacking the 2-oxo oxygen. This compound and its analogs will have the following formula:

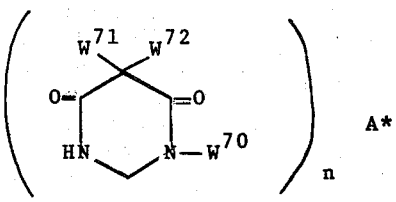

wherein:
any one of the W groups can be $-X^*$;
$X^*$, $A^*$ and $n$ have been previously;
when other than $X^*$;
$W^{70}$ is hydrogen;
$W^{71}$ is ethyl; and
$W^{72}$ is phenyl.

ENZYMES (A)

Enzymes vary widely in their substrates, cofactors, specificity, ubiquitousness, stability to temperature, pH optimum, turnover rate, and the like. Other than inherent factors, there are also the practical considerations, that some enzymes have been characterized extensively, have accurate reproducible assays developed, and are commercially available. In addition, for the purposes of this invention, the enzymes should either be capable of specific labelling or allow for efficient substitution, so as to be useful in the subject assays. By specific labelling is intended selective labelling at a site in relationship to the active site of the enzyme, so that upon binding of the receptor to the ligand, the enzyme is satisfactorily inhibited. By allowing for efficient substitution to be useful in the subject assay, it is intended that the enzyme be inhibited sufficiently when the ligand is bound to the receptor, and that the degree of substitution required to achieve this result does not unreasonably diminish the turnover rate for the enzyme nor substantially change the enzyme's solubility characteristics.

From the standpoint of operability, a very wide variety of enzymes can be used. But, as a practical matter, there will be a number of groups of enzymes which are preferred. Employing the International Union of Biochemists (I.U.B.) classification, the oxidoreductases (1.) and the hydrolases (3.) will be of greatest interest, while the lyases (4.) will be of lesser interest. Of the oxidoreductases, the ones acting on the CHOH group, the aldehyde or keto group, or the $CH-NH_2$ group as donors (1.1, 1.2, and 1.4 respectively) and those acting on hydrogen peroxide as acceptor (1.11) will be preferred. Also, among the oxidoreductases as preferable will be those which employ nicotinamide adenine dinucleotide, or its phosphate or cytochrome as an acceptor, namely 1.x.1 and 1.x.2, respectively under the I.U.B. classification. Of the hydrolases, of particular interest are those acting on glycosyl compounds, particularly glycoside hydrolases, and those acting on ester bonds, both organic and inorganic esters, namely the 3.1 and 3.2 groups respectively, under the I.U.B. classification. Other groups of enzymes which might find use are the transferases, the lyases, the isomerases, and the ligases.

In choosing an enzyme for commercialization, as compared to single or limited use for scientific investigation, there will be a number of desirable criteria. These criteria will be considered below.

The enzyme should be stable when stored for a period of at least three months, and preferably at least 6 months at temperatures which are convenient to store in the laboratory, normally −20° C or above.

The enzyme should have a satisfactory turnover rate at or near the pH optimum for binding to the antibody, this is normally at about pH 6–10, usually 6.0 to 8.0. Preferably, the enzyme will have the pH optimum for the turnover rate at or near the pH optimum for binding of the antibody to the ligand.

A product should be either formed or destroyed as a result of the enzyme reaction which absorbs light in the ultraviolet region or the visible region, that is in the range of about 250–750 nm, preferably 300–600 nm.

Preferably, the enzyme should have a substrate (including cofactors) which has a molecular weight in excess of 300, preferably in excess of 500, there being no upper limit. The substrate may either be the natural substrate, or a synthetically available substrate.

Preferably, the enzyme which is employed or other enzymes, with like activity, will not be present in the fluid to be measured, or can be easily removed or deactivated prior to the addition of the assay reagents. Also, one would want that there not be naturally occurring inhibitors for the enzyme present in fluids to be assayed.

Also, although enzymes of up to 600,000 molecular weight can be employed, usually relatively low molecular weight enzymes will be employed of from 10,000 to 300,000 molecular weight, more usually from about 10,000 to 150,000 molecular weight, and frequently from 10,000 to 100,000 molecular weight. Where an enzyme has a plurality of subunits the molecular weight limitations refer to the enzyme and not to the subunits.

For synthetic convenience, it is preferable that there be a reasonable number of groups to which the ligand may be bonded, particularly amino groups. However, other groups to which the ligand may be bonded include hydroxyl groups, thiols, and activated aromatic rings, e.g. phenolic.

Therefore, enzymes will preferably be chosen which are sufficiently characterized so as to assure the availability of sites for linking, either in positions which allow for inhibition of the enzyme when the ligand is bound to antibody, or there exist a sufficient number of positions as to make this occurrence likely.

Of the various enzymes, the following table indicates enzymes of particular interest set forth in accordance with the I.U.B. classification.

1. Oxidoreductases
  1.1 Acting on the CH—OH group of donors
    1.1.1 With NAD or NADP as acceptor
      1. alcohol dehydrogenase
      6. glycerol dehydrogenase
      26. glyoxylate reductase
      27. L-lactate dehydrogenase
      37. malate dehydrogenase
      49. glucose 6-phosphate dehydrogenase
      17. mannitol 1-phosphate dehydrogenase
    1.1.2 With cytochrome as an acceptor
      3. L-lactate dehydrogenase
    1.1.3 With $O_2$ as acceptor,
      4. glucose oxidase
      9. galactose oxidase
  1.2 Acting on the $CH-NH_2$ group of donors
    1.43 With $O_2$ as acceptor
      2. L-amino acid oxidase
      3. D-amino acid oxidase
  1.6 Acting on reduced NAD or NADP as donor
    1.6.99 With other acceptors
      diaphorase
  1.10 Acting on diphenols and related substances as donors
    1.10.3 With $O_2$ as acceptor
      1. polyphenol oxidase
      3. ascorbate oxidase
  1.11 Acting on $H_2O_2$ as acceptor
    1.11.1
      6. catalase
      7. peroxidase
3. Hydrolases
  3.1 Acting on ester bonds
    3.1.1 Carboxylic ester hydrolases
      7. cholinesterase
    3.1.3 Phosphoric monoester hydrolases
      1. alkaline phosphatase
    3.1.4 Phosphoric diester hydrolases
      3. phospholipase C
  3.2 Acting on glycosyl compounds
    3.2.1 Glycoside hydrolases
      1 a-amylase
      4. cellulase
      17. lysozyme
      23. β-galactosidase
      27. amyloglucosidase
      31. β-glucuronidase
  3.4 Acting on peptide bonds
    3.4.2 Peptidyl-amino acid hydrolase
      1. carboxypeptidase A 3.4.4 Peptidyl-peptide hydrolase
   5. α-chymotrypsin
   10. papain
3.5 Acting on C—N bonds other than peptide bonds
  3.5.1 In linear amides
    5. urease
3.6 Acting on acid anhydride bonds
  3.6.1 In phosphoryl-containing anhydrides
    1. inorganic pyrophosphatase
Lyases
  4.1 Carbon-carbon lyases
    4.1.2 Aldehyde lyases
     7. aldolase
  4.2 Carbon-oxygen lyases
    4.2.1 Hydrolases
     1. carbonic anhydrase
  4.3 Carbon-nitrogen lyases
    4.3.1 Ammonia lyases
     3. histidase

Linking Group (X)

The ligand or ligand analog is normally bonded either directly to the enzyme, by a single or double bond, or preferably to a linking group. For those ligands, which are haptens, and for which the receptors are antibodies the ligand will have been bound to a protein for the purpose of preparing the antibodies. Since the antibodies will recognize that portion of the ligand molecule which extends from the protein, ordinarily the same linking group will be attached on the same site on the ligand, as was used in bonding the ligand to the protein to provide the antigenic substance.

The functional groups which will be present in the enzyme for linking are amino (including guanidino), hydroxy, carboxy, and mercapto. In addition, activated aromatic groups or imidazole may also serve as a site for linking.

Amino acids having amino groups available for linking include lysine, arginine, and histidine. Amino acids with free hydroxyl groups include serine, hydroxyproline, tyrosine and threonine. Amino acids which have free carboxyl groups include aspartic acid and glutamic acid. An amino acid which has an available mercapto group is cysteine. Finally, the amino acids which have activated aromatic rings are tyrosine and tryptophan.

In most instances, the preferred linking group will be the amino group. However, there will be situations with certain enzymes, where one of the other linking groups will be preferred.

Where a linking group is employed for bonding the ligand to the enzyme, it will be the more frequent procedure to bond the linking group to the ligand to provide an active site for bonding to the enzyme. This may be achieved in a single step or may require a plurality of synthetic steps, including blocking and unblocking the active groups on the ligand, other than the one involved in providing the linking group. The linking groups which are reported hereafter are solely concerned with the bridge bonding the enzyme and the ligand.

Where a linking group is used, there will normally be from 1 atom to 14 atoms in the chain, more usually from 2 atoms to 8 atoms in the chain bonding the ligand to the enzyme. Where cyclic structures are involved, the cyclic structure will be equated to the number of atoms providing a similar length to the chain.

The linking group (excluding the atoms derived from the ligand and enzyme), when other than a direct bond is involved, will be of from about 1 to 30 atoms — carbon, hydrogen, nitrogen, oxygen, phosphorous, and sulfur — more usually 4 to 20 atoms.

Preferably, the linking group will normally be of from zero to 14 carbon atoms, usually from 1 to 8 carbon atoms and from 1 to 8 heteroatoms, and frequently of from 1 to 8 carbon atoms and from 1 to 4 heteroatoms, which are oxygen, sulfur and nitrogen, more usually oxygen and nitrogen. The most frequent heterofunctionalities present in the linking group are nonoxocarbonyl or thiocarbonyl, amino, imino (oxime or imidate) diazo, or oxy.

A group of linking groups are derived from a group having a nonoxocarbonyl functionality and when a second functionality is present, the second functionality may be based on a second nonoxocarbonyl functionality, a haloalkyl, O-substituted hydroxylamine, imino, amino or diazo. The linking group will normally have from 2 to 8 carbon atoms and from 1 to 4 heteroatoms which are usually oxygen and nitrogen (the heteroatoms of the ligand and enzyme are not included in the above range of heteroatoms). Such determination is somewhat arbitrary, so that between a carbon atom of the ligand and a carbon atom of the enzyme, there may be as many as six heteroatoms. The heteroatoms may be part of the linking group chain or branched from the chain, e.g., nonoxocarbonyl oxygen.

One group of linking groups will have from 2 to 6 carbon atoms, more usually 2 to 4 carbon atoms and be an aliphatic non-oxo carbonyl functionality. Another group of linking groups will have from 2 to 8 carbon atoms and have from 1 to 2 heteroatoms, e.g., oxygen and nitrogen, in the chain, such as amino, oximino, diazo, oxy, and the like.

The following tabulation indicates various linking groups, varying with the functionalities present on the ligand and the enzyme. Except as indicated, the linking group satisfies one to two valences on the ligand and enzyme functional groups to which it is bound.

| Ligand | Enzyme |
|---|---|
| amino (—NH—), or hydroxyl (—OH) | amino(—NH$_2$), hydroxyl (—OH) or mercapto (—SH) |

$$-\overset{O}{\underset{\|}{C}}-$$

$$-\overset{S}{\underset{\|}{C}}-$$

$$-\overset{O}{\underset{\|}{C}}-Z-\overset{O}{\underset{\|}{C}}-$$

$$-\overset{O}{\underset{\|}{C}}-NH-CH_2\overset{O}{\underset{\|}{C}}$$

$-P(O)(OR^x)-$ $-P(O)(R^x)-$ $$-\overset{O}{\underset{\|}{C}}-C(R^u)_2-$$

$$-\overset{O}{\underset{\|}{C}}-Z-S-$$

$-C(R^u)_2C(R^u)_2-$ $$-\overset{S}{\underset{\|}{C}}-Z-\overset{S}{\underset{\|}{C}}-$$

$$-\overset{S}{\underset{\|}{C}}-NHCH_2-\overset{S}{\underset{\|}{C}}-$$

$$-\overset{C}{\underset{\|}{C}}-Z-S-$$

| Ligand | Enzyme |
|---|---|
| (only primary amino) | [structure diagram] |
| | —Z—C(=O)— |
| | —Z—C(=S)— |
| | —Z—SO₂— |

Z — bond, hydrocarbylene of from 1 to 10 carbon atoms, more specifically alkylene of from 1 to 6 carbon atoms, alkenylene of from 2 to 6 carbon atoms, alkynylene of from 2 to 6 carbon atoms, cycloalkylene of from 4 to 10 carbon atoms and arylene of from 6 to 10 atoms; oxaalkylene of from 4 to 8 carbon atoms; and azaalkylene of from 4 to 8 carbon atoms;

$R^8$ — alkyl of from 1 to 6 carbon atoms;

$R^9$ — hydrogen or alkyl of from 1 to 3 carbon atoms;

Z or non-oxo carbonyl are preferred for bonding to hydroxyl, while non-oxo carbonyl, non-oxo thiocarbonyl and Z are preferred with amino.

| Ligand | Enzyme |
|---|---|
| oxocarbonyl (>C=O) | amino (—NH₂), hydroxyl (—OH), or mercapto (—SH) |
| | =NOZ— |
| | =NOZ—CO— |
| | =NO₂CZCO— |
| | =CHCO— |
| | =NNHZ—CO |
| | =NNHZ—CS— |
| | =NOZCS— |
| | =NO₂CZCS— |
| | =CHCS— |
| | =NOZS— |

| Ligand | Enzyme |
|---|---|
| non-oxo carbonyl (—C(=O)—) | amino (—NH₂), hydroxyl (—OH), or mercapto (—SH) |
| | —O—Z—CO— |
| | —N(R⁹)—Z—CO— |
| | —N(R⁹)—Z— |
| | —O—Z— |
| | —O—Z—CS— |
| | —N(R⁹)—Z—CS— |

| Ligand | Enzyme |
|---|---|
| arylamino (—Z″NH₂) | methine (≡CH) amino (—NH₂) |
| | =N— |

| Ligand | Enzyme |
|---|---|
| amino (—NH₂); hydroxyl (—OH) | methine (≡CH) amino (—NH₂) |
| | —Z″—N₂— |
| | —Z″—N₂— |

| Ligand | Enzyme |
|---|---|
| non-oxo carbonyl (>C=O) | methine (≡CH) amino (—NH₂) |
| | —O—Z″—N₂— |
| | —N(R⁹)—Z″—N₂— |

Z″ — arylene of from 6 to 10 carbon atoms.

Where the enzyme is to be linked through a carboxyl group of the ligand or a linking group bonded to the ligand, either esters or amides will be prepared. The ligand may be bonded to any of the linking groups which are appropriate to provide a link between the ligand and the alcohol or amine group of the enzyme to form the ester or amide group respectively. When the enzyme has an activated aromatic ring, the ligand may be bonded to an aromatic diazonium salt to provide the desired bridge.

The linking group will be selected in accordance with the following considerations. The bonds formed must be stable under the conditions of the assay. When bonding the ligand through the linking group to the enzyme, the enzyme must retain at least a portion of its activity upon isolation. The enzyme must not prevent binding of the ligand to the receptor. The functionalities should permit some selectivity, so that bonding can be directed to specific groups or types of groups in both the ligands and enzymes.

A few illustrations of how linking groups may be introduced are considered worthwhile. For example, if the ligand has an amino group, the amino may be bonded to form α-bromoacetamide. This product may then be used to form a carbon nitrogen bond to an amino acid of an enzyme which has a free amine group. e.g., lysine.

If the ligand has a keto group, the carbonyl may be condensed directly with an amino group of the enzyme, or the O-carboxy methyloxime may be preapred with O-carboxymethyl hydroxylamine. A mixed anhydride, with isobutyl chloroformate is formed, which may then be used to form the carboxamide with the amino group of the lysine.

Where a carboxyl group is present in the ligand, it may be convenient to react the carboxy group to form the monoamide of phenylenediamine. The resulting compound may then be diazotized to form the diazo salt which may be coupled with tyrosine present in the enzyme.

Another way to form the linking group would be to have an alcohol of a ligand react with succinic anhydride to form monoester. The free carboxy group can then be activated by preparing the mixed anhydride and be used for reaction with an amine in the enzyme.

With an amino group present on the ligand, this may be reacted with maleic anhydride under forcing conditions to prepare the maleimide. The maleimide may then be combined with cysteine in the enzyme to provide by a Michael's addition the 3-thiosuccinimide.

While for the most part, the enzyme may be bonded to any convenient position of the ligand, either through a functionality naturally present in the ligand or one introduced synthetically, there are preferred methods of bonding the enzyme to the ligand. First, it should be recognized that the ligand of the enzyme-bound-ligand need not have any biological activity. One is primarily concerned in not disturbing the geometry and polar site relationships of a substantial portion of the ligand molecule. Where the ligand is a hapten, the enzyme will therefore normally be bonded at the same site as was employed for attachment to the protein in the preparation of the antigen.

The particular site for attachment of the linking group will affect the specificity of the antibody for a particular compound. For example, the barbiturates are distinguished by the substituents at the 5-position. Depending upon the particular group employed as the linking group and the other group present at the 5-position, one can vary the antibody's ability to distinguish between different barbiturates, for example, between phenobarb and secobarb.

The number of ligands which may be bonded to the enzyme will be limited by the number of available sites for bonding to the enzyme. In most cases, this will be the amino groups which are present, but as already indicated, carboxyl, hydroxyl, thiol and activated aromatic rings, e.g. phenolic, are also useful sites.

Various factors will affect the number of ligands which is optimum for a specific enzyme and a specific ligand. Of prime consideration is the number required for obtaining the desired degree of inactivation when receptor is bound to the enzyme-bound-ligand. The number required will vary with the mode of attachment and the conditions for attachment of the ligand to the enzyme. Except under special circumstances, e.g. affinity labeling, there will usually be differences in degree of inhibition, as to each site to which the receptor is bound to the enzyme through a ligand. In addition, there may be cumulative effects, with an increase in the number of receptors bound to the enzyme through ligand.

Other considerations as to the number of ligands per enzyme will be the effect of the increasing number of ligands on: solubility of the enzyme-bound-ligand; activity of the enzyme-bound-ligand in the absence of receptor; and the sensitivity of the assay. Therefore, the choice of the number of ligands bonded to the enzyme is usually empirically determined, based on the effect of varying the number of ligands on the enzyme has on the assay.

With small enzymes, e.g., lysozyme, those that have molecular weights in the range of 10,000 to 30,000 from 2 to 10 ligands can be sufficient. With larger enzymes, e.g., malate dehydrogenase, of molecular weight in the range of 30,000 to 150,000, 2 to 30 ligands can be sufficient. For malate dehydrogenase 2 to 22 ligands on the average will be employed. As few ligands as possible should be bonded to the enzyme to achieve the desired degree of inhibition. Desireably, the number of ligands per enzyme should be in the range of 1 to 20, more preferably 1 to 12.

As already indicated, because of the diversity of enzymes which can be used for the assay and the variety of functionalities in the enzyme available for attachment, and the varying activities of the functionalities for being bonded to the ligand as well as their relative position to the active site of the enzymes, different numbers of ligands will be necessary for obtaining the desired degree of inhibition, when the enzyme-bound-ligand is bonded to antibody. Furthermore, the desired degree of inhibition may vary, depending on the sensitivity required for an assay for a particular ligand.

It is found, for the most part, that increasing the average number of ligands increases the amount of inhibition, up to a degree of substitution, where further substitution does not provide a significant increase in inhibition. Therefore, by varying the conditions for the reaction between the modified ligand (ligand and linking group) and the enzyme, varying degrees of substitution can be achieved. The time for the reaction, the mole ratio of ligand to enzyme and the like can be varied. Also, the reactive functionality on the linking group can be varied to change the number and sites for substitution. One can then empirically determine the number of ligands required for the desired degree of inhibition.

It should also be noted that in referring to inhibition of an enzyme, the substrate for the enzyme plays a role. Different degrees of inhibition may be achieved with different substrates. Thus, not only can one obtain varying degrees of inhibition by varying the number of ligands bonded to the enzyme, and the sites to which the ligands are bonded, but also, with some enzymes, by varying the substrate for the enzyme.

It is also found that with increasing substitution of the enzyme by ligand, there can be reduction in enzyme activity. The turnover number diminishes and there is a concomitant increase in the Michaelis constant. The decrease in turnover number with increasing substitution will vary with the enzyme. By employing enzymes which have a high initial activity, a loss of as much as 75% of initial activity can be tolerated.

(Turnover number is the number of substrate molecules transformed per unit time per enzyme molecule. Lehninger, Biochemistry, Worth Publishers, New York, 1970. Since the turnover number is reported at varying temperatures and on varying bases, e.g., weight of protein as an indication of number of enzymes or change in a spectrophotometric value as an indication of number of substrate molecules, there is at the present no simple comparison between the turnover number of different enzymes. Therefore, no minimum numerical turnover number for preferred enzymes can be given.)

Also, the ligand will be attached to the enzyme by a relatively short chain, usually of the order of 1.5 to about 20 A, more usually about 3 to 10 A.

Enzyme Assay

Turning now to a consideration of the determination of the amount of active enzyme, assaying for enzymatic activity is well established for a wide variety of enzymes. A wide diversity of media, conditions and substrates have been determined for measuring enzymatic activity. See, for example, Bergmeyer, Methods for Enzymatic Analysis, Academic Press, New York, 1965. Since there are differences, not only between assays for different enzymes, but even in the variety of assays for a particular enzyme, no general description of the assay techniques can be given.

Receptor

In the subject invention, for the most part, the receptors will be macromolecules which have sites which recognize specific structures. The recognition of the specific structures will be based on van der Waals forces, which provide a specific spatial environment which maximizes the van der Waals forces; dipole interactions, either by permanent or induced dipoles; hydrogen and ionic bonding; coordinate covalent bonding; and hydrophobic bonding. For a detailed discussion of mechanisms by which receptors bind ligands, see Goldstein, et al., Principles of Drug Action, Harper and Rowe, New York, 1968.

The macromolecules of greatest interest are proteins and nucleic acids which are found in cell membranes, blood, and other biological fluids. These compounds include enzymes, antibodies, ribonucleic acid (RNA) and deoxyribonucleic acid (DNA) and natural receptors.

The most convenient group of proteins for use in the subject invention are antibodies. These materials are conveniently used in the anaylsis of the category of ligands referred to as haptens. Antibodies are produced by introducing an immunogenic substance into the bloodstream of a living animal. The response to the introduction of the immunogenic substance for antigen is the production of antibodies which act to coat the antigen and detoxify it or precipitate it from solution. The protein forms a coat which is geometrically arranged so as to have the antigen fit the spatial arrangement of the protein. This may be analogised to a lock and key. The interaction is normally reversible, in that the antigen is subject to displacement or removal by various means without destruction of the receptor site.

There are many materials which are antigens and will produce an immunogenic response by being introduced into the bloodstream of a vertebrate. However, a number of materials of interest are not antigens, but are haptens, and in that situation, an extra step in preparing the antibody is required. This method of preparing antibodies with materials other than antigens is well known and may be found in Microbiology, Hoeber Medical Division, Harper and Rowe, 1969. See also, Landsteiner, Specificity of Serological Reactions, Dover Publications, N.Y. 1962; Kabat, et al., Experimental Immunochemistry, Charles C. Thomas, Springfield, Illinois, 1967; and Williams, et al., Methods in Immunology and Immunochemistry, Vol. I, Academic Press, New York, 1967.

The material which is to be assayed is bonded to a protein by any convenient means and the modified protein introduced into the blood stream. The same type of bonding groups used with the enzyme attachment to the ligand may be employed. The antibodies which form will include groups of antibodies which are shaped to fit the foreign moiety bonded to the protein. Therefore, antibodies are obtained which are specific to the compound or moiety bonded to the protein. By careful separation techniques, the antibodies primarily concerned with the moiety in question, can be concentrated so as to provide an antibody composition which is primarily related to the specific moiety which was bonded to the protein.

To illustrate this method, para-aminobenzene arsonate is diazotized to form the diazo salt. By combining the diazo salt with rabbit globulin, the rabbit globulin may be labeled with para-azobenzene arsonate. By introducing this composition into the blood stream of an animal other than a rabbit, for example, a sheep, antibodies can be formed which will have a spatial arrangement which accepts solely the azobenzene arsonate.

Generally, the experience obtained in bonding a specific hapten to a specific enzyme can be used in bonding other haptens to the same enzyme. This is truer the more similar the haptens. Therefore, with drugs having similar solubilities, one will ordinarily expect to obtain similar results with different but similar haptens, when bonding the haptens to the enzyme with the same linking functionality. It has therefore been found synthetically convenient to employ $O^3$-carboxymethylmorphine as a prototype to evaluate a wide variety of enzymes when bonded to a carboxy group by means of a mixed anhydride. The information thus obtained can be readily extrapolated to what one would expect from bonding other similar drugs in an analogous manner to the same enzyme.

Experimental

The following examples are offered by way of illustration and not by way of limitation.

(All temperatures are recorded in Centigrade. All parts not otherwise indicated are by weight. All pressures not otherwise indicated are mm Hg.)

EXAMPLE 1

A. Sodium phenobarbital (5.08 g, 0.02 moles), methyl chloracetate, (2.16 g, 0.02 moles) methanol (14 ml) and a catalytic amount of DMF (1 ml) were refluxed for 2 hours. A white precipitate separated out during this period. The reaction mixture was cooled to room temperature and filtered. The methanolic filtrate was evaporated to dryness to yield about 5 g of a gummy material which solidified on standing. (The precipitate from the above filtration partially dissolved when rewashed with distilled water. The water-insoluble material, about 50 mg, proved to be the dialkylated product).

The solidified material was stirred with 20 ml of 1 N NaOH solution for 15 minutes and then filtered. This separated the alkali-insoluble derivatives, the monoalkylated product and unreacted phenobarbital. The alkaline filtrate was acidified with conc. HCl to a pH 2 and the white gummy precipitate which formed was taken up in methylene chloride.

Drying ($MgSO_4$) and evaporation of the organic solvent yielded 4 g of gummy material. This was dissolved in benzene and ghromatographed over a column of silica gel (40 g). Elution was with chloroform and 100 ml fractions were collected. (The progress of the chromatography was followed by TLC, since the dialkylated product has an $R_f$ 0.9, the monoalkylated material $R_f$ 0.6 and phenobarbital $R_f$ 0.1 with chloroform/methanol 95:5).

Fractions 2–5 combined yielded on evaporation 1.6 g of a gum which solidifed on standing. Trituration with petroleum ether and filtration yielded 1.5 g of a white powder which was shown by NMR to be the required monoalkylated derivative, N-methoxycarbonylmethyl phenobarbital.

Further elution with chloroform (500 ml) yielded 1.5 g of a white solid which was shown to be unreacted phenobarbital.

B. The monoester prepared above (1 g) was refluxed with 10 ml of 20% HCl solution for 3.5 hours. The cooled reaction mixture was diluted with water (20 ml) and extracted with ether. Evaporation of the other extract yielded 0.98 g of a colorless gum which very slowly solidifed on standing. NMR and TLC showed that complete hydrolysis had occurred to the acid.

A pure sample of the acid was prepared by preparative TLC for UV analysis, with chloroform/methanol (5:1) as eluent.

C. To a cold (0°) solution of 29.6 mg N-carboxymethyl phenobarbital (0.1 mmoles) and 14.3 $\mu l$ triethyl amine (0.1 mmoles) in 1.0 ml dry dimethyl formamide was added 13.1 µl isobutyl chloroformate (0.1 mmoles). The solution was stirred at 4° for 1 hour before use.

D. The cold solution of mixed anhydride was added dropwise with stirring to a cold (4°) solution of 0.100 g lysozyme 6.9 mmole) and 0.100 g sodium bicarbonate in 10 ml water. The resulting heterogeneous solution was stored at 4° for 48 hours before being dialyzed against water for 48 hours. (The water was changed 3 times daily). The dialysate was then chromatographed on Bio-Rex 70 employing a 0.05–0.20 M pH 7.15 phosphate buffer gradient for elution.

E. The assay employing the phenobarbital conjugate had an enzyme concentration in the enzyme conjugate stock solution of $1.71 \times 10^{-5}$ M, an antibody concentration based on binding sites in the stock solution of $1.66 \times 10^{-5}$ and a binding constant for the antibody of $5.94 \times 10^{7}$. The assay solution had a total volume of 0.800 ml, employed a urine volume of 0.080 ml, had an enzyme concentration of $2.14 \times 10^{-7}$ and an antibody concentration based on binding sites of $2.08 \times 10^{-7}$. The assay was carried out for 40 seconds and the sensitivity was found to to 0.3 µg/ml, the minimum detectable amount.

EXAMPLE 2

A. Ozone was passed through a cooled (dry ice/acetone) solution of sodium secobarbital (2.6 g, 0.01 mole) in methanol (250 ml). After ozonlysis was completed (positive KI test), nitrogen was passed through the reaction mixture to remove all traces of ozone and then dimethyl sulfide (7 ml) was added to the cold solution with a syringe and allowed to stand overnight at room temperature. After evaporation of the solvent, the residue was diluted with water (20 ml), acidified with conc. HCl and extracted with chloroform (3 × 20 ml). The chloroform extract was dried (MgSO$_4$) and evaporated to yield 2.4 g of gummy colorless material. NMR showed the presence of an aldehyde group at 89.7 ppm. This was used without further purification in the reaction with malonic acid.

B. A sample of pure aldehyde (0.24 g, 1 mmole), malonic acid (0.21 g, 2 mmoles) 20 ml pyridine and 1 ml piperidine were refluxed together for 6 hours. The solvent was removed on the flash evaporator and the residue dissolved in 10% sodium bicarbonate solution. The bicarbonate solution was washed with ether (3 × 20 mol) and then acidified with conc. HCl. Extraction with ether (2 × 20 ml) and then with chloroform (2 × 25 ml) followed by drying (MgSO$_4$) and evaporation of the combined organic layers yielded 0.23 g (80% yield) of a white solid shown by NMR to be the desired acid 5-(γ-crotonic acid)-5-(1′-methylbutyl) barbituric acid. Recrystallization from CHCl$_3$/CCl$_4$ yielded 0.16 g of pure material.

C. To a solution of 5-(α-crotonic acid)-5-(1′-methylbutyl) barbituric acid, (0.282 g, 1 mmole) in DMF (3 ml), cooled to −15° (ice-salt bath) there was added triethylamine (0.28 ml, 2 mmoles) and isobutylchloroformate (0.13 ml, 1 mmole). Stirring was continued at −15° for 15 minutes and then at 0° for 30 minutes. The reaction mixture was then added dropwise, with a syringe, to a cooled solution of BSA (400 mg) in water (56 ml) containing NaHCO$_3$ (2.6 g). The reaction mixture was stirred at 0° (cold room) for 5 days when initial turbidity had nearly all disappeared. The solution was then dialyzed against 4 l. of phosphate buffer (pH 8) followed by distilled water to yield the desired conjugate.

D. Lysozyme, 240 mg (100 µmoles of lysine) was dissolved in 20 ml of water and the solution chilled to 0° C. The solution was adjusted to pH 10.2 with 0.05 N sodium hydroxide and the mixed anhydride (100 µmoles) in 1.5 ml dry dimethyl formamide added dropwise while the solution was kept between pH 9.6–9.9 by addition of base as required. The pH was maintained at 9.6 for another 30 minutes, after which time the mixture was centrifuged.

The supernatant was dialyzed against 0.05 mole Trismaleate, pH 8.0. The pellet formed by centrifugation dissolved in 20 ml 8M urea, and was dialyzed as described above, yielding additional amounts of enzyme. The urea dialysis treatment was repeaated until only 10 mg of insoluble material remained.

E. An enzyme stock solution was prepared of the secobarbital conjugate to lysozyme having a concentration of enzyme of $2.08 \times 10^{-5}$ M. The antibody stock solution was $1.42 \times 10^{-5}$ M based on binding sites, and the antibody had a binding constant of $8.4 \times 10^{7}$ by FRAT$^R$. In the assay solution, the enzyme concentration was $1.56 \times 10^{-7}$ M, the antibody concentration based on binding sites was $2.66 \times 10^{-7}$ M, the total assay volume was 0.800 ml, the urine volume 0.080 ml, the time for the assay 40 seconds, and the sensitivity found to 0.2 µg/ml.

EXAMPLE 3

Sodium hydride (0.85 g of a 50% oil paste, 18 mmoles) was added in small amounts to a stirred solution of glutethimide, (3.7 g, 17 mmoles) in dry DMF (10 ml). Stirring was continued for about 5 minutes, when gas evolution was no longer observed. Sodium chloroacetate (2.2 g) was then added and the reaction mixture was stirred with heating in an oil bath at 100° for 3 hours. After cooling, the reaction mixture was diluted with 50 ml water, acidified with conc. HCl and then poured into 200 ml ether. The ether layer was speareated and washed with water (2 × 50 ml). The organic layer was dried (MgSO$_4$) and evaporated to yield 3.4 g of a white solid. Recrystallization from carbon tetrachloride/methylene chloride yielded the analytical sample of the acid.

Anal. Calcd. for C$_{15}$H$_{17}$NO$_4$: C, 65.44; H, 6.22; N, 5.08. Found: C, 64.92; H, 6.20; N, 4.99.

The N-carboxymethyl glutethimide can be conjugated to lysozyme as set forth in the conjugation for the barbitals. Antibodies can be prepared by conjugating the N-carboxymethyl glutethimide to bovine serum albumin (BSA) and injecting the conjugated BSA into animals to obtain the appropriate antibodies. The assay is carried out in the same manner as previously described for lysozyme.

EXAMPLE 4

A. To a suspended solution of sodium phenobarbital (1.0 g, 3.93 mmoles) in dry dimethylformamide (12 ml) was added ethyl-5-bromovalerate (920 mg, 4.43 mmoles) with stirring, and the mixture was heated at 40° for 10 minutes to give a clear solution. The mixture was stirred at room temperature for 15 hours, and then potassium iodide (200 mg) was added to complete the reaction, which was followed by TLC (silica gel, 5% methanol - 95% chloroform). Most of the solvent was evaporated under reduced pressure to leave an oil, which was dissolved in dichloromethane (50 ml) and washed with water. The solution was shaken once with 2.5 wt.% sodium carbonate solution (25 ml) to remove unchanged starting phenobarbituric acid. The dichloromethane layer, after being washed with water and dried over anhydrous sodium sulfate, was evpaorated to leave an oil (1.4 g). This oil was separated into two fractions by preparative TLC, silica gel. The oil was developed with 5% methanol - 95% chloroform, and each fraction was collected by cutting and extracted with acetone. The products, after removal of the solvent, were dissolved in dichloromethane, washed with water, and dried over anhydrous sodium sulfate. One fraction ($R_f$ 0.7) gave a colorless oil (0.5 g, 36%) which proved to be analytically pure monoalkylated compound II by IR and PMR spectra, and microanalysis:

Anal. Calcd. for $C_{19}H_{24}O_5N_2$: C, 63.32; H, 6.71; N, 7.77. Found: C, 63.35; H, 6.75; N, 7.86.

B. The ethyl ester prepared above (120 mg, 0.333 mmole) was dissolved into a mixture of conc. hydrochloric acid (2.5 ml) tetrahydrofuran (5 ml) and water (1 ml), and then kept at room temperature overnight. After evaporation of tetrahydrofuran under reduced pressure, the residue was diluted with saturated sodium chloride solution (10 ml) and extracted with dichloromethane. The dichloromethane layer was extracted with saturated sodium bicarbonate solution, and the combined alkaline layers, after being carefully acidified with conc. hydrochloric acid in an ice bath, were extracted with dichloromethane. The dichloromethane solution was washed with water, dried over anhydrous sodium sulfate, and evaporated to dryness to give an oily residue (100 mg, 93%), which crystallized on standing. Recrystallization from ether/n-hexane gave an analytical sample of the desired acid.

Anal. Calcd. for $C_{17}H_2O\ O_5N_2$: C, 61.43; H, 6.07; N, 8.43. Found: C, 61.48; H, 6.08; N, 8.43.

C. A sample of the above prepared acid was dried overnight under vacuum at 80° before use.

In a flask protected from moisture, 166 mg of the acid was dissolved in 5 cc of dry DMF and 150 $\mu$l of triethylamine added. The solution was cooled to $-15°$ and then 65 $\mu$l (0.5 mmole) of isobutyl chloroformate added. The mixture was stirred for 1 hour with the temperature maintained between $-5°$ and 0°.

Lysozyme (1.2 g, 0.5 mmole lysine) was dissolved in 80 ml distilled water in a beaker equipped with a magnetic stirrer. The solution was cooled in an ice-water bath to 4° and the pH was adjusted to 9.5 with 0.5 M NaOH. The anhydride reaction mixture prepared above was added dropwise with stirring. The pH was kept at 9.5-9.7 during this addition by the slow addition of 0.5 M NaOH. The solution was stirred an additional 90 minutes at 4°.

The pH was then lowered to 8.5 by the addition of 1 M HCl and the mixture centrifuged at 12,000 rpm for 20 minutes. The supernatant fraction (S) was dialyzed against 6 changes of 0.05 M Tris buffer pH 8.0 The precipitate on being stirred briefly with 100 ml 8 M urea dissolved completely ($P_1$). Upon dialysis (as for S) a significant amount of material came out of solution. The precipitated material, separated by centrifugation, was redissolved in urea and redialyzed ($P_2$, $P_3$, $P_4$ fractions). The various fractions of soluble enzyme ($P_1$, $P_2$, $P_3$, $P_4$, etc.) were all tested for inhibition with phenobarbital antisera (equal amount of antisera was used with all fractions). The fractions $P_1$, $P_2$, $P_3$ and $P_4$ showed inhibitions of 77, 85, 86 and 92% respectively. A pool of $P_2$, $P_3$ and $P_4$ was prepared for use in the assay.

EXAMPLE 5

A sample of the secobarbital acid prepared as described in Example 2 was dried overnight under vacuum at 80° before use.

In a flask equipped with a magnetic stirrer and a drying tube was dissolved 140 mg of the above acid in 5 ml dry DMF. After the addition of 137 $\mu$l dry triethylamine the mixture was cooled to $-15°$ and 68.5 $\mu$l of isobutyl chloroformate added. The reaction was stirred at $-5°$ to 0° for 1 hour and then conjugated to lysozyme.

A solution of lysozyme (1.2 g, 0.5 mmole lysine) in 80 ml distilled water was cooled in an ice bath to 4° and the pH adjusted to 9.5 with 0.5 M NaOH. The acid anhydride prepared above was added dropwise with stirring as the pH was maintained at 9.5-9.7 by the slow addition of 0.5 M NaOH. The heterogeneous reaction mixture was allowed to stir an additional 90 minutes at 4° before the pH was lowered to 8.5 with 1 M HCl. The mixture was centrifuged at 12,000 rpm for 20 minutes. The precipitate, on being stirred with 100 ml 8 M urea dissolved completely but a significant amount of material came out of solution during dialysis (6 changes with 0.05 M tris at pH 8.0). The dialysate was centrifuged and the supernatant ($P_1$) retained. The pellet was again suspended in 8 M urea and dialyzed, and in this manner a number of soluble enzyme fractions ($P_2$, $P_3$ . . . $P_n$) were obtained. The precipitate fractions were all tested for their ability to be inhibited with seconal antisera (the same amount of antisera was used for all fractions). Inhibition of activity of 75, 80, 91 and 93% was obtained for fractions $P_1$, $P_2$, $P_3$ and $P_4$ respectively. The $P_1$ fraction was not considered suitable for use in the assays, but fractions $P_2$, $P_3$ and $P_4$ were all combined and used as a pool.

EXAMPLE 6

A general conjugation procedure was employed as follows: commercial G-6-PDH, (4.19mg/ml, Beckman Microbics) was dialyzed against 0.055M Tris-HCl buffer, pH 7.9. The resulting dialyzed enzyme solution was then employed in the reaction. An aliquot of the enzyme solution was placed in a glass vial equipped with a micro-magnetic stirring bar and a pH electrode, and when reduced temperature was employed, cooled in an ice bath. To the stirring solution was added as a solid NADH and glucose-6-phosphate. To the stirring solution was then added slowly by means of a syringe needle below the liquid surface, sufficient carbitol to provide the desired amount of co-solvent. To this stirred solution was then added by means of a syringe in the same manner as the carbitol, the modified hapten as the carbityloxycarbonyl ester in carbitol. The reaction mixture was then incubated and aliquots withdrawn, diluted and the rates determined as to deactivation and inhibition by an excess of antibody.

The following table indicates the relevant amounts of materials employed, the temperatures and time, as well as the percent deactivation and percent inhibition.

The assay procedure for determining percent deactivation and percent inhibition is as follows. Two parts by volume of a solution 0.1M NAD in water at pH 5-6 is combined with 3 parts by volume of 0.11M glucose-6- phosphate in 0.055M Tris-HCl buffer of pH 7.9. An aliquot from the conjugation reaction mixture is diluted 1:1,000 with the above indicated buffer. An assay solution is formed from 50 microliters of the G-6-P-NAD solution, 750 microliters of buffer, 50 microliters of buffer or buffer containing antibody, depending upon whether the deactivation or inhibitability was being determined, and 50 microliters of the enzyme conjugate or enzyme control. Portions of buffer are employed to insure quantitative transfers. The solution is aspirated into a spectrometer and the rate of NADH production followed at 340nm at 37°. The change in OD per min. is determined between the second and third minutes.

The following table indicates the results.

(R is the linking group between the non-oxo carbonyl and the ring.)

phenobarbityl) pentanoic acid and 6.95microliters of triethylamine and cooled to $-10°$. To this solution was then added 8.5 microliters of carbityl chloroformate, the mixture warmed to 0° and allowed to stand for 45 min at which time it was ready for use.

The other mixed anhydrides were prepared accordingly, using equimolar amounts at substantially the same concentrations in the same solutions.

A generalized procedure was employed for conjugating the mixed anhydride to glucose-6-phosphate dehydrogenase. This procedure is as follows:

Into a reaction vessel was introduced an aqueous buffered solution of glucose-6-phosphate dehydrogenase, glucose-6-phosphate and NADH. To the mixture was then added carbitol, followed by an aliquot of the anhydride solution prepared as described above

TABLE I

IMIDATE

| Hapten | Enzyme conc. mg/ml | G-6-PDH Vol ml | Hapten conc. M | Vol μl | NADH mg | G-6-P mg | Total Carbitol % v/v | Buffer M | Temp °C | Time days | Deactivation % | Inhibition % |
|---|---|---|---|---|---|---|---|---|---|---|---|---|
| Phenobarb | | | | | | | | | | | | |
| —$N^3$—R— | | | | | | | | | | | | |
| —$CH_2$C- | 2 | 0.75 | $7.7 \times 10^{-3}$ | 20 | 19.8 | 10.45 | 4 | Tris 0.055 | 0 | 0.75 | 59 | 76 |
| $H_2OCH_2$—* | 2 | 3 | 0.1 | 300 | 118.8 | 62.5 | 21 | Tris 0.055 | 0–4 | 5 | 47 | 74 |
| —$CH_2CH_2OCH_2$— | 2 | 0.5 | 0.218 | 69 | 19.8 | 10.45 | 24 | Tris 0.055 | 4 | 8 | 30 | 48 |
| —$CH_2$—** | 2 | 0.5 | 0.218 | 69 | 19.8 | 10.45 | 24 | Tris 0.055 | 20 | 3 | 58 | 55 |
| —$CH_2$ —** | | | | | | | | | | | | |
| Diphenyl hydantoin | | | | | | | | | | | | |
| $N^1$—R— | | | | | | | | | | | | |
| —$CH_2CH_2OCH_2$— | 1.45 | 1 | 0.075 | 100 | 20 | 10 | 24 | Tris 0.055 | 0 | 5.75 | 75 | 70 |
| $H_2$—$CH_2$— | 2 | 0.5 | 0.25 | 60 | 19.8 | 10.45 | 24 | Tris 0.055 | 4 | 2 | 54 | 83 |

*methyl ester
**no dialysis, otherwise products dialyzed against four changes of 0.055M Tris-HCl, pH 7.9

EXAMPLE 7

A number of reactions were carried out employing mixed anhydrides of hapten carboxylic acid with carbityl carbonate. A general procedure was employed for preparing the mixed anhydride. The following procedure is illustrative, using a derivative of phenobarb.

Into a reaction vessel was introduced 0.5ml of dimethylformamide (DMF), 16.6mg of 5-(N- using a syringe with the needle below the surface. Base was added as required to maintain the pH at about 9 ± 0.5. At the end of the reaction, any precipitate or cloudiness was substantially removed by centrifugation of the sample. The assay employed followed the procedure described in Example 6.

The following table indicates the materials employed and the percent deactivation and inhibition.

TABLE II

MIXED ANHYDRIDES

| Hapten | Enzyme conc mg/ml | G-6-PDH Vol ml | Hapten conc M | Vol μl | NADH mg | G-6-P mg | Total Carbitol % v/v | Total Base Added μl | pH° |
|---|---|---|---|---|---|---|---|---|---|
| Phenobarb | | | | | | | | | |
| —$N^3$—R— | | | | | | | | | |
| —$CH_2CH_2OCH_2$— | 0.84 | 1 | 0.1 | 20.4 | 19.8 | 10.45 | 24 | 84* | 9.2 |
| —$CH_2CH_2OCH_2$— | 0.84 | 1 | 0.1 | 10.2 | 19.8 | 10.45 | 24 | 84* | 9.2 |
| —$CH_2CH_2CH_2CH_2$— | 1.38 | 0.5 | 0.19 | 18 | 9.9 | 5.25 | 24 | 22** | 7.8 |
| Secobarb | | | | | | | | | |
| 5—allyl, 5—R | | | | | | | | | |
| —($CH_3$)$CHCH_2CH_2$— | 2.08 | 0.5 | 0.187 | 21+ | 19.8 | 10.45 | 24 | 19 | ~9.0 |
| 5—(2'—pentyl), 5—R | | | | | | | | | |
| —$CH_2CH=CH$— | 1.95 | 1 | 0.187 | 19.3 | 20 | 10 | 24 | 17 | 8.9 |
| Primidone | | | | | | | | | |
| $N^3$—R— | | | | | | | | | |
| —$CH_2$— | 1.73 | 1 | 0.187 | 13 | 20 | 10 | 24 | 10** | 9.0 |
| OPH | | | | | | | | | |
| $N^1$—R— | | | | | | | | | |
| —$CH_2$— | 1.95 | 2.5 | 0.19 | 30 | 20 | 10 | 24 | 9*** | 8.5 |
| | 0.955 | 0.595 | 0.38 | 4 | 9.9 | 5.25 | 24 | 116 | 9.5 |
| $CH_2$—$CH_2$—$CH_2$—$CH_2$— | | | | | | | | several | |
| —$CH_2CH_2OCH_2$— | 0.955 | 0.5 | 0.2 | 15+ | 20 | 10 | 17 | drops* | 9 |

TABLE II—Continued

MIXED ANHYDRIDES

| Hapten | Enzyme conc mg/ml | G-6-PDH Vol ml | Hapten conc M | Hapten Vol μl | NADH mg | G-6-P mg | Total Carbitol % v/v | Total Base Added μl | pH° |
|---|---|---|---|---|---|---|---|---|---|
| —CH$_2$CH$_2$NHCOCH$_2$N(Me)CH$_2$— | 1.77 | 0.5 | 0.187 | 4 | 20 | 10 | 24 | several drops** | — |
| —CH$_2$(CH$_3$)CH$_2$— | 1.46 | 0.5 | 0.2 | 9.5 | 19.8 | 10.5 | — | | 9 |

MIXED ANHYDRIDES

| Hapten | Buffer | M | Temp °C | Dialysis++ | Deactivation % | Inhibition % |
|---|---|---|---|---|---|---|
| Phenobarb —N$^a$—R— | | | | | | |
| —CH$_2$CH$_2$OCH$_2$— | PO$_4$ | 0.01 | 37 | yes | 75.1 | 62 |
| —CH$_2$CH$_2$OCH$_2$— | PO$_4$ | 0.01 | 37 | yes | 60.8 | 54 |
| —CH$_2$CH$_2$CH$_2$CH$_2$— | PO$_4$ | 0.002 | 0 | yes | 66 | 48.5 |
| Secobarb 5—allyl, 5—R | | | | | | |
| —(CH$_3$)CHCH$_2$CH$_2$— | Tris | 0.055 | −4 | yes | 28.5 | 63 |
| 5—(2′—pentyl), 5—R | | | | | | |
| —CH$_2$CH=CH— | Tris | 0.055 | 0 | no | 70 | 70 |
| Primidone N$^3$—R— | | | | | | |
| —CH$_2$— | Tris | 0.055 | 0 | yes | 60 | 57 |
| OPH N$^1$—R— | | | | | | |
| —CH$_2$— | Tris | 0.055 | 0 | no | 55 | 80 |
| CH$_2$—CH$_2$—CH$_2$—CH$_2$— | PO$_4$ | 0.01 | 0–4 | no | 90 | 50 |
| —CH$_2$CH$_2$OCH$_2$— | PO$_4$ | 0.01 | 0 | yes | 73 | 52 |
| —CH$_2$CH$_2$NHCOCH$_2$N(Me)CH$_2$— | Tris | 0.055 | 0 | yes | 87 | 18 |
| —CH$_2$(CH$_3$)CH$_2$— | Tris | 0.055 | 0 | | 59 | 53 |

*0.1M Na$_2$CO$_3$
**0.1N NaOH
***1N NaOH
+ DMF
++ 0.055 Tris buffer = pH 7.9, 4 changes
° at completion of reaction The precursor compounds for the subject invention are described in co-pending application Ser. No. 443,553, filed Feb. 19, 1974. That disclosure is incorporated herein by reference.

In addition to those materials described in the co-pending application, the following are preparations of precursors which are not presently disclosed in the aforementioned co-pending application.

EXAMPLE A

In a flame-dried, 3-neck, 250ml round-bottomed flask was placed 4g Primidone (18.3 m moles, dried at 80°/0.1mm) and 0.88g of 50% NaH dispersion (18.3 m moles), and the flask was evacuated and filled with N$_2$ 3 times. DMF (60ml, dried over molecular sieves) was added and after the initial reaction subsided, the solution was heated to an internal temperature of 70°–75° and stirred under N$_2$ for 3 hrs, then left to stir overnight at room temperature, during which time a precipitate formed. The mixture was heated to 75° and transferred with N$_2$ pressure to an addition funnel. It was kept from precipitating by warming with a heat gun during dropwise addition to a solution of 8.0 ml ethyl bromoacetate (12g, 4 equivalents) in 60 ml DMF at room temperature under N$_2$. The addition took 2 hrs. After another 20 min the excess halide and solvent were removed on the rotary evaporator (45°/~1 mm).

The solid residue was dissolved in ~600 ml ethyl acetate and washed 3 times with water, once with saturated brine, dried over Na$_2$SO$_4$ and evaporated. The solid residue was extracted three times with boiling chloroform, and the chloroform evaporated. The chloroform insoluble solid was recovered starting material, 1.3g.

The chloroform soluble products were taken up in acetonitrile and washed once with petroleum ether to remove mineral oil. On evaporation, the acetonitrile fraction yielded a semi-crystalline oil which weighed about 5g. The tlc on silica gel with ether as eluent showed primarily two spots, dialkyl product (R$_f$=0.60) and monoalkyl product (R$_f$=0.33). Column chromatography with 100g silica gel PF with ether (3 lbs pressure) gave 2.01g dialkyl product as an oil. Elution with ethyl acetate then gave 1.45g monoalkyl product. The fractions were analyzed by tlc combined and the desired product crystallized twice from a boiling benzene solution by the addition of cyclohexane to give 1.325g (23.4% yield) white platelets, m.p. 138°–41°.

The ester product, 1.00g (3.30 mmoles) was dissolved in 15ml THF (freshly distilled) and 1.0ml 6N NaOH was added with stirring. After 0.5 hr, enough water was added to dissolve the precipitated salt. After 3 hr, the THF was evaporated and the basic layer washed once with ether and then acidified to pH 1 with conc. HCl and scratched to induce crystallization. The precipitated solid was recrystallized by dissolving in the minimum amount of boiling ethanol, adding water (~30ml) and concentrating the solution down to about 20 ml and cooling slowly, whereupon the acid crystallized. Drying in vacuo at 100° over P$_2$O$_5$ gave 0.686g white spars, m.p. 189–90°. Another 0.130 g was obtained by extracting the initial filtrate with ethyl acetate and crystallizing the residue obtained on work-up. Total yield = 0.816g (90%).

EXAMPLE B

Into 150ml of DMSO was dissolved with warming 15.1g of sodium phenobartital. After cooling to room temperature, 18g of 2-acetoxy-2'-tosyloxy diethyl ether in 150ml of DMSO was added and the mixture stirred under nitrogen for 24 hours. The DMSO was evaporated in vacuo at a mildly elevated temperature and the residue partioned between 300ml dilute HCl and 900ml diethyl ether. The ether fraction was washed three times in water followed by washing with 5 weight percent aqueous sodium bicarbonate. Extraction was continued with 5 weight percent sodium carbonate until no starting material was present in the organic phase as indicated by tlc. The remaining product in the organic phase was extracted with 0.5N aqueous sodium hydroxide 6 times.

Acidification of the sodium hydroxide extracts and extraction with ether gave the alcohol in 4.3g. Acidification and extraction of the bicarbonate and carbonate extracts gave 8.1g of an oil. The alcohol was chromatographed on 80g silica gel with ether to yield 2.5g of the product as an oil.

To a cold solution of 142mg of the alcohol prepared above in approximately 8ml of acetone was added excess Jones reagent (2.5M chromium trioxide in 4M sulfuric acid). After 30 min at room temperature, tlc indicated the absence of the starting material. To the mixture was then added isopropanol until the solution turned colorless, at which time the solution was combined with water and extracted 3 times with ethyl acetate. The combined ethyl acetate extracts were extracted 3 times with 5 weight percent aqueous sodium bicarbonate and the sodium bicarbonate acidified with 6N HCl, followed by extracting the aqueous fractions 3 times with fresh ethyl acetate. The organic phase was dried over sodium sulfate and evaporated to yield 139mg of an oil. An aliquot of the oil was taken up in benzene, and the product crystallized overnight. m.p. 156°–8°.

EXAMPLE C

To a stirred suspension of 12g of the sodium salt of diphenyl hydantoin in DMSO was added under nitrogen 3.4ml of chloroacetonitrile. The suspension turned clear and stirring was continued for 1.5 hours. The DMSO was distilled off in vacuo at a mildly elevated temperature and the residue dissolved in approximately 400ml of ethyl acetate which was then washed twice with water, once with aqueous saturated sodium bicarbonate, followed by drying over sodium sulfate. After evaporating the solvent, the residue was triturated with 50ml absolute ethanol to yield 9.77g of white crystals. Recrystallization from 125ml of absolute ethanol gave the desired product, m.p. 194°–6°.

Two grams of the nitrile prepared above was dissolved in 75ml of 1N ethanolic sodium hydroxide, the mixture stirred overnight at room temperature, diluted with water and then extracted with ether. The aqueous layer was separated and acidified to pH 1 with 6N HCl. The resulting precipitate was filtered and recrystallized from aqueous ethanol to yield 1.43g.

EXAMPLE D

A. Toluenesulfonic acid monohydrate (100g, 0.53 moles) was placed in a 500ml round bottom flask and heated at 100°, with stirring for 4 hrs. at 0.05mm Hg. The melting point of anhydrous tosic acid is 38°. Upon cooling, 200ml of acetyl chloride was added and the mixture refluxed for 5 hrs. The excess acetyl chloride and the acetic anhydride generated was removed by distillation under reduced pressure and the residue placed under 0.05mm Hg overnight. The crystalline residue was stored in a vacuum dessicator over potassium hydroxide and used in the next reaction without further purification.

B. Acetic-toluenesulfonic mixed anhydride (21.4g, 100 mmole) was added to 8.6g (100 mmole) 2-methyl-tetrahydrofuran (freshly distilled from lithium aluminum hydride) stirring in an ice bath under nitrogen. The mixture was stirred at 0° for 2 hrs, then at room temperature for 4 hrs. The resulting brown liquid was taken up in 100ml diethyl ether, washed with 50ml cold water, followed by 50ml saturated aqueous sodium bicarbonate. After drying over sodium sulfate and evaporation in vacuo (room temperature), the liquid residue was placed under 0.05mm Hg for 1 hr and stored in the freezer. All attempts to purify the tosylate failed and it was used in the next reaction crude. Yield, 26.0g (86%).

C. To a stirring solution of 12.9ml (70 mmoles) freshly distilled diethyl malonate in 35ml freshly distilled HMPA (hexamethyl phosphoramide) under nitrogen was added 3.0g (70 mmoles) of a 56% dispersion of sodium hydride in mineral oil and the solution stirred with cooling in ice until dissolution was complete. Crude 1-acetoxy-4-toluenesulfonoxypentane (21.0g, 70 mmoles) was then added dropwise over a period of 10 minutes and the resulting mixture stirred at 0° for 2 hrs. The reaction mixture was heated to 50° overnight (15 hrs) and upon cooling to room temperature, poured into a slurry of 100mg ice and 50ml 2N hydrochloric acid. The aqueous mixture was quickly extracted with 3 × 100ml diethyl ether and the combined ethereal extracts washed with 50ml saturated aqueous sodium bicarbonate solution. The dried ($Na_2SO_4$) ethereal solution was evaporated in vacuo and vacuum distilled to give 10.0g b.p. 100°–112°/0.02mm Hg.

D. Freshly cut sodium (4.0g, 174 mmoles) was dissolved in 100ml absolute ethanol (dried over 3-A molecular sieves). To this solution was added 18.5g (64.2 mmoles) diethyl 5-acetoxy-2-pentyl) malonate and 4.8g (80 mmoles) urea and the resulting mixture boiled until approximately 60ml solution remained. After refluxing for 5 hrs, the mixture was cooled in ice and 50ml anhydrous diethyl ether added. The white precipitate was filtered on a medium glass frit and washed with 20ml of cold absolute ethanol. The white powder was dissolved in a minimum of hot water, acidified to pH 2 with conc. hydrochloric acid, stripped in vacuo and dried at 0.05mm Hg over potassium hydroxide pellets overnight. The residue was dissolved in 75ml hot methanol to which 75ml hot acetone was added and the resulting white suspension of sodium chloride filtered and the clear filtrate evaporated in vacuo. The resulting residue was recrystallized from the minimum amount of boiling acetone to yield 10.0g (73%) white crystalline powder of m.p. 169°–70°.

E. To a stirring solution of 280mg (7.0 mmoles) sodium hydroxide and 1.50g (7.0 mmoles) 5-(5'-hydroxy-2'-pentyl) barbituric acid in 5ml water was added 580µl (7.0 mmoles) allyl bromide. The resulting mixture was stirred rapidly under a nitrogen atmosphere for 3 days. The mixture was stripped in vacuo, dissolved in 5ml 5% aqueous sodium bicarbonate and extracted with 3 × 10ml ethyl acetate. The combined extracts were dried over sodium sulfate, evaporated in vacuo to 5ml and heated to boiling. After adding 30ml hot benzene, the mixture was allowed to cool. Filtration of the crystalline precipitate yielded 1.2g white crystals m.p. 115°–120°. One recrystallization afforded 1.0g (57%) m.p. 120°–121°.

F. To a stirring solution of 508mg (2 mmoles) 5-(5′-hydroxy-2′-pentyl)-5-allyl barbituric acid in 10ml acetone cooled in ice (0°) was added dropwise 500μl 4M Jones reagent (2.5M $CrO_3$ in 4M $H_2SO_4$) over a period of 15 minutes. Then an additional 500μl 4M Jones reagent was added en mass and the mixture stirred at room temperature overnight. A few drops of ethanol were added to discharge the yellow color and the mixture poured into 30ml 10% sodium chloride. The resulting green solution was extracted with 3 × 60ml of ethyl acetate and the combined organic phase was extracted with 30ml 5% aqueous sodium bicarbonate. The aqueous layer was saturated with sodium chloride, acidified to pH 2 with concentrated hydrochloric acid and extracted with 3 × 60ml ethyl acetate. The combined organic extracts were dried over sodium sulfate evaporated in vacuo and placed under 0.05mm Hg for 1 hr. The residue was dissolved in a minimum of hot acetone (approximately 5ml) and hot benzene added until mixture just turned cloudy. After cooling and standing of the mixture for 5 hrs, there was obtained 450mg (81%) white crystals m.p. 198°–199°.

EXAMPLE E

Into a reaction vessel was introduced 5g of phenyl hydantoin and 2.4ml (1.98g) of ethylene imine and diluted with 70ml of dry ethanol. After heating for 16 hrs at reflux, the product was stripped in vacuo, leaving an oil. The product could be recrystallized from aqueous ethanol.

tography, but also by an electron spin resonance technique, reagents for which is sold under the trademark $FRAT^R$, supplied by Syva Company.

As previously indicated, various protocols can be employed. While the order of addition is not crucial, one order is preferred, particularly where the binding of the receptor to the enzyme-bound-ligand is stronger than the binding of the receptor to the ligand.

The preferred order is to combine the unknown medium with the receptor. The binding of ligand with receptor is rapid, so that the addition of the enzyme-bound-ligand may be made promptly after combining the unknown medium and receptor, usually within a minute. After the addition of the enzyme-bound-ligand a short time interval is usually allowed to pass, and the enzymatic activity determined as the average rate over one-half to a few minutes, usually fewer than 5 minutes.

In some situations, e.g. low ligand concentration, it may be desirable to measure enzymatic activity at equilibrium. For measurements at equilibrium, the binding constants of the ligand and enzyme-bound-ligand should be within one order of magnitude.

The first subgenera of compounds to be considered are the barbitals, phenobarbital and secobarbital. The reagents employed are those prepared in Example 1 and 2. The following table indicates the degree of cross-reactivity with a number of drugs of similar structure to the barbitals, as well as with other members of the barbital family.

The results show the excellent qualitative and quantitative correlation between the various methods. The combined enzyme assay is sensitive to 0.5μg/ml of secobarbital with somewhat less sensitivity to other barbiturates. As expected, the enzyme assay will be most sensitive for the barbiturates to which the antibodies were prepared.

BARBITAL CROSS-REACTIVITY

| Compound | Concentration μg/ml | $M \times 10^5$ | Phenobarbital 5 Max Rate | Concentration μg/ml | $M \times 10^5$ | Secobarbital % Max Rate |
|---|---|---|---|---|---|---|
| Phenobarbital | 2.54 | 1 | 42.4 | 2.54 | 1 | 0 |
|  | 0.254 | 0.1 | 10.0 | 0.25 | 0.1 | 0 |
| Secobarbital | 13 | 5 | 16.7 | 2.6 | 1 | 30.1 |
|  | 1.3 | .5 | 9.9 | 0.26 | 0.1 | 3.3 |
| Amobarbital | 2.5 | 1 | 16.7 | 2.48 | 1 | 16.3 |
|  | 0.25 | .1 | 6.1 | 0.25 | 0.1 | 3.3 |
| Tabutal | 3 | 1.34 | 12.4 | 3 | 1.34 | 9.1 |
|  | 0.3 | .13 | 3.9 | 0.3 | 0.13 | 1.4 |
| Thiopental | 3 | 1.13 | 15.8 | 3 | 1.13 | 16.0 |
|  | 0.3 | .11 | 4.8 | 0.3 | 0.11 | 1.4 |
| Glutethimide | 21.7 | 10 | 9.0 | 21.7 | 10 | 0.8 |
|  | 2.17 | 1 | 1.4 |  |  |  |
| Morphine | 285 | 100 | 2.2 | 285 | 100 | 2.8 |
| Demerol | 284 | 100 | 0 | 284 | 100 | 2.1 |
| Diphenyl hydantoin | 300 | 100 | 18.4 | 300 | 100 | 7.7 |

Assays

To further demonstrate the utility of the subject invention and its versatility in being able to distinguish a wide range of different compounds and to quantitatively or semi-quantitatively determine the concentration of these compounds in different physiological fluids, a number of assays were carried out. In these assays, the sensitivity of the assays was determined as to minimum concentrations required for detectable levels. Also comparisons were made with a wide variety of compounds to determine whether the antibodies employed would respond to compounds other than those which were intended to be assayed. In many instances the results were checked not only by thin layer chromatography.

Comparison of results of the subject enzyme assay with results obtained from thin layer chromatography were in agreement with one exception as to the presence or absence of barbiturates. By using the two different antibodies for the two barbiturates, a qualitative judgment could be made of the class of barbiturates present.

A barbiturate assay was carried out be combining antibodies to phenobarbital and secobarbital and the lysozyme conjugate prepared as descriped in Examples 4 and 5. The phenobarbital-lysozyme conjugate (11 μl, $1.066 \times 10^{-5}$ M) was combined with 4.65 μl ($1.89 \times 10^{-5}$ M) of the secobarbital-lysozyme conjugate, 5 μl of 1% BSA in pH 6.0 tris-maleate 0.025 M buffer and 29.35 µl of pH 6.0 tris-maleate 0.025 M buffer to provide 50 µl of reagent with a maximum rate of ≈ 300 OD/min. (enzyme units). The antibody solution was prepared by combining 22.8 µl of phenobarbital antibody ($1.03 \times 10^{-5}$ M based on binding sites) with 15.4 µl of secobarbital antibody ($1.14 \times 10^{-5}$ M based on binding sites) and 11.8 µl of pH 7.4 tris- maleate 0.025 M buffer.

The assay for lysozyme was carried out in the conventional manner, employing 50 µl of urine.

A group of 21 barbiturate positive urine samples were collected and analyzed by thin layer chromatography (TLC), gas-liquid chromatography (GLC), FRAT[R] and the subject enzyme assay technique. The following table indicates the results.

TABLE

| Sample | Independent Laboratory | TLC | GLC µg/ml | FRAT µg/ml | Enzyme Assay µg/ml |
|---|---|---|---|---|---|
| 1 | pentobarbital unidentified barb methadone | pentobarbital | pentobarbital (3.5) | 15 | 5.8 |
| 2 | phenobarbital methadone | phenobarbital | phenobarbital (1.0) butabarbital (2.0) | 1.6 | 2.15 |
| 3* | phenobarbital methadone | phenobarbital | phenobarbital (15.0) | 9.0 | 4.7 |
| 4 | unidentified barb methadone | pento or amobarbital | amobarbital (2.5) | 22 | 7.1 |
| 5 | pentobarbital methadone | amo, pento or butabarbital | pentobarbital (6.5) secobarbital | 31 | >100 |
| 6* | phenobarbital methadone | phenobarbital | phenobarbital (12) | 8 | 1.1 |
| 7* | phenobarbital methadone | phenobarbital | phenobarbital (14) | 9 | 0.8 |
| 8 | phenobarbital morphine methadone | phenobarbital | phenobarbital (4) | 2.9 | 2.2 |
| 9 | phenobarbital | pheno, amo, buta or pentobarbital | phenobarbital (32) | 140 | 64 |
| 10 | pentobarbital phenobarbital unident. narc. | amo, buta, or phenobarbital | amobarbital (<.2) phenobarbital (12) | 24 | 32.5 |
| 11 | phenobarbital methadone | phenobarbital | phenobarbital (0.7) | 2.4 | 1.1 |
| 12 | secobarbital methadone | pentobarbital | phenobarbital (0.3) secobarbital (1.7) | 11 | 5.9 |
| 13 | phenobarbital methadone amphetamine | phenobarbital | phenobarbital (1.5) amobarbital (<.2) | 3.7 | 3.0 |
| 14 | phenobarbital methadone | phenobarbital | phenobarbital (2.5) | 2.2 | 1.2 |
| 15 | phenobarbital methadone | phenobarbital | phenobarbital (1.8) | 3.7 | 1.7 |
| 16 | pentobarbital methadone | amobarbital butabarbital | amobarbital (1) | 23.0 | 40.0 |
| 17 | pentobarbital methadone | amobarbital pentobarbital | amobarbital (1.8) secobarbital (0.9) | 14.0 | 8.8 |
| 18 | unidentified barb methadone | phenobarbital | phenobarbital (1.7) | 1.9 | 1.55 |
| 19 | phenobarbital methadone | phenobarbital | phenobarbital (14.0) pentobarbital (<.4) | 17.0 | 5.3 |

TABLE — Continued

| Sample | Independent Laboratory | TLC | GLC µg/ml | FRAT µg/ml | Enzyme Assay µg/ml |
|---|---|---|---|---|---|
| 20 | phenobarbital methadone | phenobarbital | phenobarbital (0.7) | 9.4 | 2.4 |
| 21 | pentobarbital methadone | pentobarbital | pentobarbital (0.1) | 0.5 (negative) | negative |

*These samples were all basic (pH 8 – 9.5) after standing at room temperature with no preservative for up to two months. The enzyme assay barbiturate levels were obtained after the pH of these samples was adjusted to pH ≅6.0.

Next, assays were carried out for the determination of diphenyl hydantoin. In order to carry out the assay, two lyophilized reagent compositions were prepared, which will be referred to as Reagent A and Reagent B. The amount of enzyme which is employed provides a rate of reaction during the period of interest of about 0.8 OD/min. The ratio of antibody to enzyme employed is chosen so as to give the highest slope for the concentrations of interest. That is, one determines the δOD/min at both the low and high concentration of interest and divides the difference by δOD at the high concentration of interest. With diphenyl hydantoin, the ranges of interest are from about 5–30µg/1. Reagent A comprises diphenyl hydantoin antibody; NAD, 0.04M; G-6-P 0.066M; sodium azide, 0.05% (w/v); Thimerosal, 0.005% (w/v); Tris-HC1, 0.055M; pH 8.1 at 30°(adjusted from 7.9 with sodium hydroxide solution) and rabbit or egg albumin, 1% (w/v). Reagent B, contains the G-6-PDH-diphenyl hydantoin conjugate, rabbit or egg albumin, 1% (w/v), sodium azide, 0.05% (w/v); Thimerosal, 0.005% (w/v); and Tris-HC1, pH 7.9 at 30°, 0.055M. The buffer which is employed for dilution contains the Tris-HC1, sodium azide and Thimerosal at the concentrations and pH indicated for Reagent B. Six samples were prepared employing lyophilized serum base powders containing 0, 2.5, 5, 10, 20, and 30µg/ml of diphenyl hydantoin. Reagents A and B are diluted with the appropriate buffers to obtain the desired response at the different concentrations. In preparing the assay solutions, 50µl of the sample is combined with 250µl of the buffer solution. 50µl of the dilute solution are then introduced into the assay medium with 250µl of buffer. This is followed by 50µl of Reagent A diluted with 250µl of buffer followed by 50µl of reagent B diluted with 50µl of buffer. The sample is introduced into the spectrometer within 5 seconds, a first reading taken within 18 seconds, and a second reading taken within 80 seconds, the difference being the δOD/min. In accordance with this technique, accurate determinations of diphenyl hydantoin can be made at 1µg/ml. or less. As for cross-reactivity, determined as the concentration of drug producing an equivalent response to 5µg/ml. of diphenyl hydantoin, only the metabolite of diphenyl hydantoin, the para-hydroxy derivative, showed a significant cross-reactivity, and even this was relatively minor.

In accordance with the invention, concentrations required for assaying of a wide variety of ligands are of the order of $10^{-7}$M or less with samples of 50µl or less of unknown. With extremely small amounts of reagents, a very high degree of sensitivity is obtained. Furthermore, the excellent specificity of the receptor sites to a particular compound or its close analogs permits a wide range of assay possibilities with a high degree of sensitivity and specificity to particular compounds. Therefore, extremely minor amounts of biologically active materials may be assayed in the various body fluids, such as blood, saliva, or urine.

The subject invention provides an extraordinarily sensitive probe for the assaying of extremely minute amounts of specific materials with a high degree of specificity and accuracy. Alternatively, the method can be used qualitatively to determine the presence of absence of particular materials with a high degree of specificity.

Much technology for enzyme assays has already been developed. Enzyme assays are well-known: the optimum conditions for the assay, the substrates, and methods for detecting enzymatic activity are amply developed in the literature. Furthermore, much of the work involved in radioimmunoassay is directly applicable to the subject invention. The antisera available for radioimmunoassay are substantially applicable to ligands employed in the subject invention.

Methods for bonding compounds to enzymes at other than the active site are also well developed. There is ample literature on the functionalities which can be employed in bonding a particular compound to a particular site or amino acid in an enzyme, without substantially affecting the activity of the enzyme. The above examples demonstrate that the presence of an antibody when bound to a ligand which is bound to an enzyme can significantly reduce the activity of the enzyme. This is done either sterically or by altering the conformation of the enzyme. Furthermore, the enzymatic activity is substantially regenerated by introducing a ligand into the medium which can effectively displace the ligand bound to the enzyme, thus freeing the enzyme from the antibody.

By having a free enzyme-bound-ligand for each ligand that displaces an enzyme-bound-ligand from its receptor, a large number of substrate molecules will react and the concentration of the remaining substrate or the product can be measured. Thus, a significant amplification results (by coupling the enzyme to a ligand) because many molecules are modified by virtue of the presence of a single molecule.

The subject invention permits assays of compounds which are present in extremely low concentrations or absolute amounts. First, because receptors are available having high specificity, one or a group of compounds can be determined without significant interference from other compounds. By virtue of having one or more enzymes present in relation to a specific ligand, one can obtain a large change in concentration of the enzyme substrate based on a single ligand. In addition, the use of enzymes provides a great versatility in the detection system which is employed.

Although the foregoing invention has been described in some detail by way of illustration and example for purposes of clarity of understanding, it will be obvious that certain changes and modifications may be practiced within the scope of the invention as limited only by the scope of the appended claims.

What is claimed is:

1. An enzyme-bound-ligand having a lactam functionality of the formula:

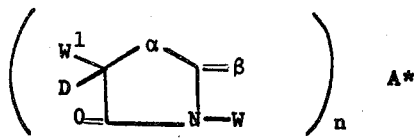

wherein:
one of the W groups is $X^*$ or a hydrogen of one of the W groups is replaced by $X^*$;
D is hydrogen or hydrocarbyl of from 1 to 8 carbon atoms, having from 0 to 1 site of ethylenic unsaturation as the only aliphatic unsaturation;
$\beta$ is $H_2$ or chalcogen, when $\alpha$ is amido and otherwise oxygen;
when other than $X^*$, W is hydrogen and $W^1$ is hydrocarbyl of from 1 to 8 carbon atoms having from 0 to 1 site of ethylenic unsaturation as the only aliphatic unsaturation;
$\alpha$ is ethylene, amido, or imino;
$A^*$ is an enzyme bonded at other than its reactive site, having a number ($n$) of ligands in the range of one up to the molecular weight of $A^*$ divided by 2,000; and
$X^*$ is a bond or linking group of from 1 to 10 atoms other than hydrogen which are carbon, oxygen, and nitrogen.

2. An enzyme-bound-ligand according to claim 1, wherein in $X^*$, oxygen is present as non-oxo or oxo carbonyl or oxy and nitrogen is present as amino.

3. An enzyme-bound-ligand according to claim 1, wherein alpha is imino and D is phenyl.

4. An enzyme-bound-ligand according to claim 1, wherein alpha is ethylene and D is phenyl or ethyl.

5. An enzyme-bound-ligand according to claim 1, wherein beta is $H_2$ and alpha is amido.

6. An enzyme-bound-ligand according to claim 1, wherein said enzyme is an hydrolase or oxidoreductase.

7. An enzyme-bound-ligand having a lactam functionality of the formula:

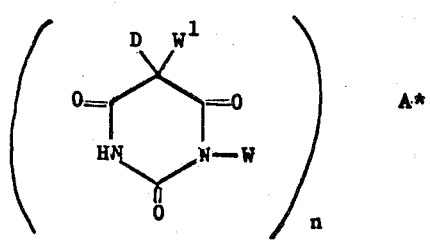

wherein:
one of the W groups is $X^*$ or a hydrogen of the W groups is replaced by $X^*$;
D is hydrogen or hydrocarbyl of from 1 to 8 carbon atoms, having from 0 to 1 site of ethylenic unsaturation as the only aliphatic unsaturation;
when other than $X^*$, W is hydrogen and $W^1$ is hydrocarbyl of from 1 to 8 carbon atoms, having from 0 to 8 carbon atoms, having from 0 to 1 site of ethylenic unsaturation as the only aliphatic unsaturation;
$A^*$ is an enzyme, which is a hydrolase or oxidoreductase bonded at other than its reactive site, having a number ($n$) of ligands in the range of 2 to 30; and
$X^*$ is a bond or linking group of from 2 to 8 atoms other than hydrogen, which are carbon, oxygen and nitrogen, the oxygen being present as non-oxo carbonyl and the nitrogen being present as amino or amido.

8. An enzyme-bound-ligand according to claim 7, wherein W is $X^*$ and said enzyme is lysozyme or glucose-6phosphate dehydrogenase.

9. An enzyme-bound-ligand according to claim 7, wherein $W^1$ is $X^*$ and said enzyme is lysozyme or glucose-6-phosphate dehydrogenase.

10. An enzyme-bound-ligand having a lactam functionality of the formula:

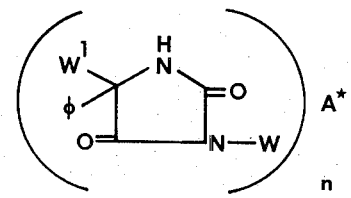

wherein:
one of the W groups is $X^*$ or a hydrogen of the W groups is replaced by $X^*$;
$\phi$ is phenyl;
when other than $X^*$, W is hydrogen and $W^1$ is phenyl;
$A^*$ is an enzyme, which is an hydrolase or an oxidoreductase, bonded at other than its reactive site, having a number ($n$) of ligands in the range of 2 to 30; and
$X^*$ is a bond or linking group of from 2 to 8 atoms other than hydrogen, which are carbon, oxygen and nitrogen, wherein the oxygen is present as non-oxo carbonyl or oxy and the nitrogen is present as amino or amido.

11. An enzyme-bound-ligand according to claim 10, wherein $W^1$ is phenyl and W is $X^*$ and said enzyme is lysozyme or glucose-6-phosphate dehydrogenase.

12. An enzyme-bound-ligand having a lactam functionality of the formula:

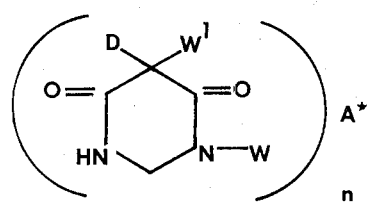

wherein:
one of the W groups is $X^*$ or a hydrogen of one of the W groups is replaced by $X^*$;
D is phenyl or ethyl;
when other than $X^*$, W is hydrogen and $W^1$ is different from D and is phenyl or ethyl;
$A^*$ is an enzyme, which is an hydrolase or an oxidoreductase, bonded at other than its reactive site, having a number ($n$) of ligands in the range of 2 to 30; and
$X^*$ is a bond or linking group of from 2 to 8 atoms other than hydrogen, which are carbon, oxygen and nitrogen, wherein the oxygen is present as non-oxo carbonyl or oxy and the nitrogen is present as amino or amido.

13. An enzyme-bound-ligand according to claim 12, wherein said enzyme is lysozyme or glucose-6-phosphate dehydrogenase.

* * * * *